United States Patent
Subramanian et al.

(10) Patent No.: US 11,212,217 B2
(45) Date of Patent: Dec. 28, 2021

(54) SPANNING TREE ENABLED LINK AGGREGATION SYSTEM

(71) Applicant: Dell Products L.P., Round Rock, TX (US)

(72) Inventors: Palanisamy Subramanian, Tamil Nadu (IN); Ravisekhar Akkineni, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/669,204

(22) Filed: Oct. 30, 2019

(65) Prior Publication Data

US 2021/0135981 A1 May 6, 2021

(51) Int. Cl.
*H04L 12/709* (2013.01)
*H04L 12/713* (2013.01)
(Continued)

(52) U.S. Cl.
CPC .......... *H04L 45/245* (2013.01); *H04L 45/586* (2013.01); *H04L 45/60* (2013.01);
(Continued)

(58) Field of Classification Search
CPC ..... H04L 45/245; H04L 45/586; H04L 69/14; H04L 49/70; H04L 49/30; H04L 45/60; Y02D 30/50
See application file for complete search history.

(56) References Cited

U.S. PATENT DOCUMENTS

| 2008/0228943 A1* | 9/2008 | Balus | H04L 12/462 709/239 |
| 2011/0222440 A1* | 9/2011 | Phillips | H04L 49/10 370/256 |

(Continued)

OTHER PUBLICATIONS

IEEE: A Spanning Tree Protocol over Mobile Wireless Ad Hoc Networks; Tome Gomes, Lucas Guardalben, Paulo Salvador and Susana Sargento, 2013; (Year: 2013).*

(Continued)

*Primary Examiner* — Hassan A Phillips
*Assistant Examiner* — Mohammed S Chowdhury
(74) *Attorney, Agent, or Firm* — Joseph Mencher

(57) ABSTRACT

A system includes a first aggregated networking device that is included with the second aggregated networking device in a link aggregation domain. The first aggregated networking device provides, to a networking device via a link aggregation group (LAG), a first control message that defines itself as a root bridge and the first link aggregation domain as a designated bridge. The second aggregated networking device detects that the first aggregated networking device is unavailable. The second aggregated networking devices then provides, to the networking device via the LAG, a second control message that defines itself as the root bridge, and the first link aggregation domain as the designated bridge. Network traffic is transmitted in response to the networking device accepting the second aggregated networking device as a new root bridge based on the first link aggregation domain being defined as the designated bridge in both the first and second control messages.

20 Claims, 16 Drawing Sheets

(51) Int. Cl.
*H04L 29/06* (2006.01)
*H04L 12/931* (2013.01)
*H04L 12/935* (2013.01)
*H04L 12/773* (2013.01)

(52) U.S. Cl.
CPC ............. *H04L 49/30* (2013.01); *H04L 49/70* (2013.01); *H04L 69/14* (2013.01)

(56) References Cited

U.S. PATENT DOCUMENTS

| | | | | |
|---|---|---|---|---|
| 2012/0113870 A1* | 5/2012 | Chuang | .................. | H04L 41/12 370/255 |
| 2012/0182866 A1* | 7/2012 | Vinayagam | ........... | H04L 45/245 370/228 |
| 2013/0064071 A1* | 3/2013 | Bos | ...................... | H04L 12/437 370/223 |
| 2013/0194914 A1* | 8/2013 | Agarwal | ................. | H04L 47/10 370/225 |
| 2013/0235876 A1* | 9/2013 | Sajassi | .................... | H04L 41/12 370/401 |
| 2014/0092725 A1* | 4/2014 | Lindstrom | .......... | H04L 41/0654 370/221 |
| 2014/0140221 A1* | 5/2014 | Manam | .................. | H04L 41/12 370/250 |
| 2014/0362709 A1* | 12/2014 | Kashyap | ................ | H04L 43/04 370/250 |
| 2015/0188753 A1* | 7/2015 | Anumala | ............ | H04L 12/4675 370/225 |
| 2016/0182366 A1* | 6/2016 | Gossain | .............. | H04L 12/2838 370/256 |
| 2016/0191374 A1* | 6/2016 | Singh | ...................... | H04L 45/22 370/228 |
| 2017/0195199 A1* | 7/2017 | Dorai | .................. | H04L 12/4641 |
| 2017/0257309 A1* | 9/2017 | Appanna | ............ | H04L 12/4633 |
| 2018/0026810 A1* | 1/2018 | Manthiramoorthy | ... | H04L 45/28 370/249 |
| 2018/0034648 A1* | 2/2018 | Nagarajan | ............. | H04L 69/325 |
| 2018/0248803 A1* | 8/2018 | Nagarajan | ............... | H04L 12/46 |
| 2018/0302315 A1* | 10/2018 | Kamisetty | ............. | H04L 12/462 |
| 2020/0014613 A1* | 1/2020 | Palapra | ............... | H04L 41/0663 |

OTHER PUBLICATIONS

IEEE P802.1AX-Rev/D2.0 : Bridges and Bridged Networks—Link Aggregation, May 2019; (Year: 2019).*
IEEE Communication within Clouds: Open Standards and Proprietary; Protocols for Data Center Networking; Carolyn J. Sher DeCusatis and Aparico Carranza, New York City College of Technology Casimer M. DeCusatis, IBM Corporation. (Year: 2012).*
IP.COM—Flexible link aggregation; An IP.com Prior Art Database Technical Disclosure; IP.com No. IPCOM000254926D; IP.com Electronic Publication Date: Aug. 13, 2018. (Year: 2018).*
IEEE P802.1AX-Rev/D1.0—Bridges and Bridged Networks—Link Aggregation; Dec. 5, 2018 (Year: 2018).*

* cited by examiner

SPANNING TREE ENABLED LINK AGGREGATION SYSTEM

BACKGROUND

The present disclosure relates generally to information handling systems, and more particularly to recovery operations in information handling systems providing a spanning tree enabled link aggregation when a root link aggregation primary information handling system becomes unavailable.

As the value and use of information continues to increase, individuals and businesses seek additional ways to process and store information, One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices, utilize link aggregation to combine multiple network connections in order to increase throughput, provide redundancy, and/or provide a variety of other link aggregation benefits known in the art. For example, some switch devices utilize the Virtual Link Trunking (VLT) protocol, which is a proprietary link aggregation protocol that is provided by the Assignee of the present disclosure and that allows for the setup of an aggregated link to a plurality of different switch devices. The VLT protocol is a layer-2 link aggregation protocol that may be utilized by server devices and access switch devices to, for example, provide a redundant load-balanced connection to the core-network in a loop-free environment, provide uplinks between access switch devices and core switch devices, and/or provide a variety of other VLT benefits that would be apparent to one of skill in the art. Conventional VLT systems provide node level and link level resiliency without the use of the conventional spanning tree protocol, as the use of the conventional spanning tree protocol in place of the VLT protocol can result in the blocking of at least a portion of an aggregated link provided by the VLT switch devices, which results in a waste of bandwidth.

In some situations, it may be beneficial to block links (as is provided by the conventional spanning tree protocol) to VLT node devices such as the switch devices discussed above, as described in U.S. Pat. Nos. 10,341,138 B2 and 10,397,099 B2, both of which are incorporated herein by reference in their entirety. However, issues may arise in such situations when a VLT node device fails, which can result in spanning tree protocol convergence that may cause traffic loss for unacceptable durations of time. For example, with reference to a two-node VLT system, a pair of VLT node devices may be connected to each other by an Inter-Chassis Link (ICL), and may each be part of a VLT Link Aggregation Group (LAG) domain coupled to a Top Of Rack (TOR) switch device via a VLT LAG. In the event the VLT node devices operating as a root VLT primary node device fails, is restarted, is upgraded, or otherwise become unavailable, after some time period the other VLT node device will become the root VLT primary node device, and start sending first control messages (e.g., Bridging Protocol Data Units (BPDUs)) to the TOR switch device that identify itself as the root VLT primary node device (also referred to as the "root bridge".)

However, the TOR switch device includes root information that was previously learned from the root VLT primary node device that became unavailable, and until that root information expires, the TOR switch device will operate to ignore the first control messages. That root information in the TOR switch device will expire after 3 times the hello-time interval, after which the TOR switch device will send second control messages to the "new" root VLT primary node device that identify the TOR switch device as the root bridge. Upon receiving the "inferior" root information from the TOR switch device in the second control messages, the "new" root VLT primary node device will enter a dispute state and keep its port connected to the TOR switch device in a blocking state until spanning tree convergence occurs, and in some situations that may result in more than 10 seconds of traffic loss even though the topology is a non-loop topology. As would be appreciated by one of skill in the art, in non-loop topologies where there are no redundant paths, any traffic loss in such a situation should be on the order of milliseconds (e.g., such traffic loss should occur only for the time needed for a LAG hash change on the port where the member link is down).

In another example, with reference to a square VLT system, a first pair of VLT node devices may be connected to each other by a first ICL, and may each be part of a first VLT LAG domain. Furthermore, a second pair of VLT node devices may be connected to each other by a second ICL, may each be part of a second VLT LAG domain, and the second VLT LAG domain and the first VLT LAG domain may be coupled to each other via a first VLT LAG and a second VLT LAG. In the event the VLT node devices in the first VLT LAG domain operating as the root VLT primary node device fails, is restarted, is upgraded, or otherwise become unavailable, after some time period the other VLT node device in the first VLT LAG domain will become the root VLT primary node device, and will start sending first control messages (e.g., (BPDUs)) out of its ports to each of the VLT node devices in the second VLT LAG domain that identify itself as the root VLT primary node device (also referred to as the "root bridge".)

However, the VLT node devices in the second VLT LAG domain include root information that was previously learned from the root VLT primary node device that became unavailable, and until that root information expires, the VLT node devices in the second VLT LAG domain will operate to ignore the first control messages. That root information in the VLT node devices in the second VLT LAG domain will expire after 3 times the hello-time interval, with the root information for the root VLT primary node device that became unavailable expiring with respect to the VLT LAG that provided the root port, resulting in the second VLT LAG that provided the alternate port being re-designated to provide the root port (i.e., because it has the root information for the root VLT primary node device that became unavailable.) The VLT LAGS provided by the second VLT LAG domain will then advertise the root information for the root VLT primary node device that became unavailable to the remaining VLT node devices included on the first VLT LAG domain, and the ports on the remaining VLT node devices will change their roles to provide a root port and an alternate port. In some situations, these operations may cause 2-3 seconds of traffic loss, as the remaining VLT node devices in the square topology are circulating the root information for the root VLT primary node device that became unavailable. Furthermore, one of skill in the art will appreciate that such operations may cause an undesirable VLT node device to be provided as the root bridge.

Accordingly, it would be desirable to provide a spanning tree enabled link aggregation system that addresses the issues discussed above.

SUMMARY

According to one embodiment, an Information Handling System (IHS) includes a communication system that includes: at least one inter-chassis link (ICL) port that is configured to couple to a first ICL that is coupled with a first aggregated networking device to form a link aggregation domain; and a first port that is configured to couple to a first Link Aggregation Group (LAG) link that is included in a first LAG and that is coupled to a networking device; a processing system that is coupled to the communication system; and a memory system that is coupled to the processing system and that includes instructions that, when executed by the processing system, cause the processing system to provide a spanning tree protocol engine that is configured to: detect that the first aggregated networking device that is designated as a root link aggregation primary node is no longer available and, in response, designate the communication system as the root link aggregation primary node; provide, to the networking device via the first LAG link, a first control message that defines: the communication system as a new root bridge; and the first link aggregation domain as a new designated bridge; and transmit, in response to the networking device accepting the communication system as the root bridge based on the first link aggregation domain being defined as the designated bridge in both the first control message and a second control message that was transmitted to the networking device by the first aggregated networking device prior to the first aggregated networking device becoming unavailable and via a second LAG link included in the first LAG, network traffic between the networking device and the communication system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
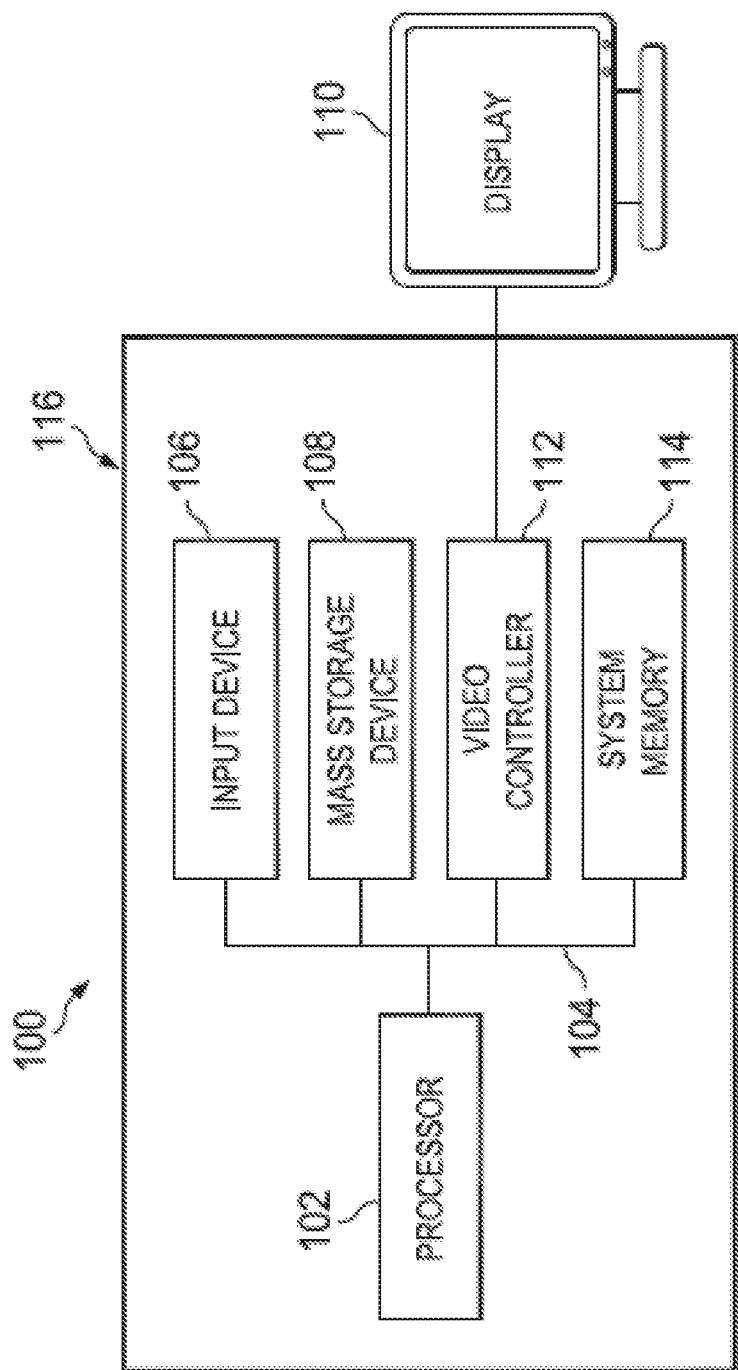
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
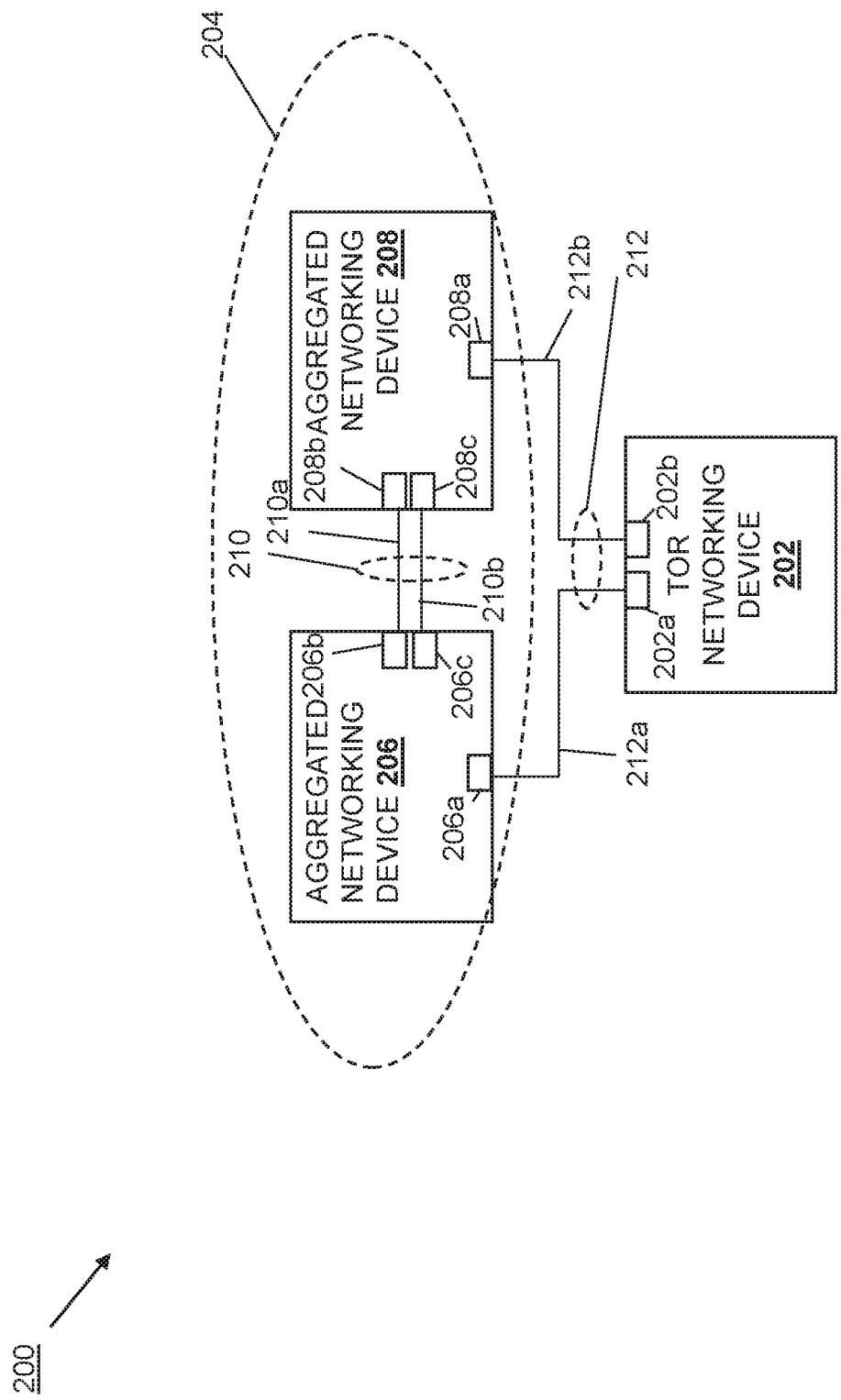
FIG. 2 is a schematic view illustrating an embodiment of a spanning tree enabled link aggregation system.

Referring now to FIG. 2, an embodiment of a spanning tree enabled link aggregation system 200 is illustrated. In the illustrated embodiment, the spanning tree enabled link aggregation system 200 incudes a Top Of Rack (TOR) networking device 202. In an embodiment, the TOR networking device 202 may be provided by the IHS 100 discussed above with reference to FIG. 1, and/or may include some or all of the components of the IHS 100, and in specific examples may be provided by a TOR switch device that is included in a rack that also houses a plurality of server devices (e.g., including a server device providing a host device.) However, while illustrated and discussed as a TOR switch device included in a rack, one of skill in the art in possession of the present disclosure will recognize that other devices provided in the spanning tree enabled link aggregation system 200 may include any devices that may be configured to operate similarly as the TOR networking device 202 discussed below while falling within the scope of the present disclosure as well.

In the illustrated embodiment, the spanning tree enabled link aggregation system 200 includes link aggregation domain 204 that is provided by a pair of aggregated networking devices 206 and 208 that are coupled together by one or more inter-networking-device links (e.g., inter-networking-device link 210a between a port 206b on the aggregated networking device 206 and a port 208b on the aggregated networking device 208, and inter-networking-device link 210b between a port 206c on the aggregated networking device 206 and a port 208c on the aggregated networking device 208, as illustrated in FIG. 2) that have been aggregated into an Inter-Chassis Link (ICL) 210. In the illustrated embodiment, the aggregated networking device 206 is coupled to the TOR networking device 202 by at least one link 212a between a port 206a on the aggregated networking device 206 and a port 202a on the TOR networking device 202, and the aggregated networking device 208 is coupled to the TOR networking device 202 by at least one link 212b between a port 208a on the aggregated networking device 208 and a port 202b on the TOR networking device 202, with the links 212a and 212b having been aggregated into a Link Aggregation Group (LAG) 212 between the TOR networking device 202 and the link aggregation domain 204. In an embodiment, either or both of the aggregated networking devices 206 and 208 may be provided by the IHS 100 discussed above with reference to FIG. 1, and/or may include some or all of the components of the IHS 100. For example, the aggregated networking devices 206 and 208 may be provided by any of a variety of aggregated switch devices that would be apparent to one of skill in the art in possession of the present disclosure.

In a specific example, the spanning tree enabled link aggregation system 200 may utilize the Virtual Link Trunking (VLT) protocol, which as discussed above is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. However, as discussed above, the STP may still be implemented in some VLT topologies. As such, with reference to FIG. 2, the link aggregation domain 204 may provide a VLT domain, with the aggregated networking devices 206 and 208 provided by VLT peer devices that are coupled together via the ICL 210 provided by a VLT interconnect (VLTi), and with the LAG 212 provided by a VLT LAG that couples the VLT peer devices to the TOR networking device 202. In the examples provided below, the aggregated networking device 206 is described as operating as a primary VLT peer device, and the aggregated networking device 208 is described as operating as a secondary VLT peer device. Also, in the examples provided below, the aggregated networking device 206 is described as operating as a root bridge. However, one of skill in the art in possession of the present disclosure will appreciate that the aggregated networking device 208/secondary VLT peer device may perform the functionality described below for the aggregated networking device 206/primary VLT peer device while remaining within the scope of the present disclosure as well. While a specific spanning tree enabled link aggregation system 200 has been illustrated and described, one of skill in the art in possession of the present disclosure will recognize that the spanning tree enabled link aggregation system of the present disclosure may include a variety of components and component configurations while remaining within the scope of the present disclosure as well.

Figure 3:
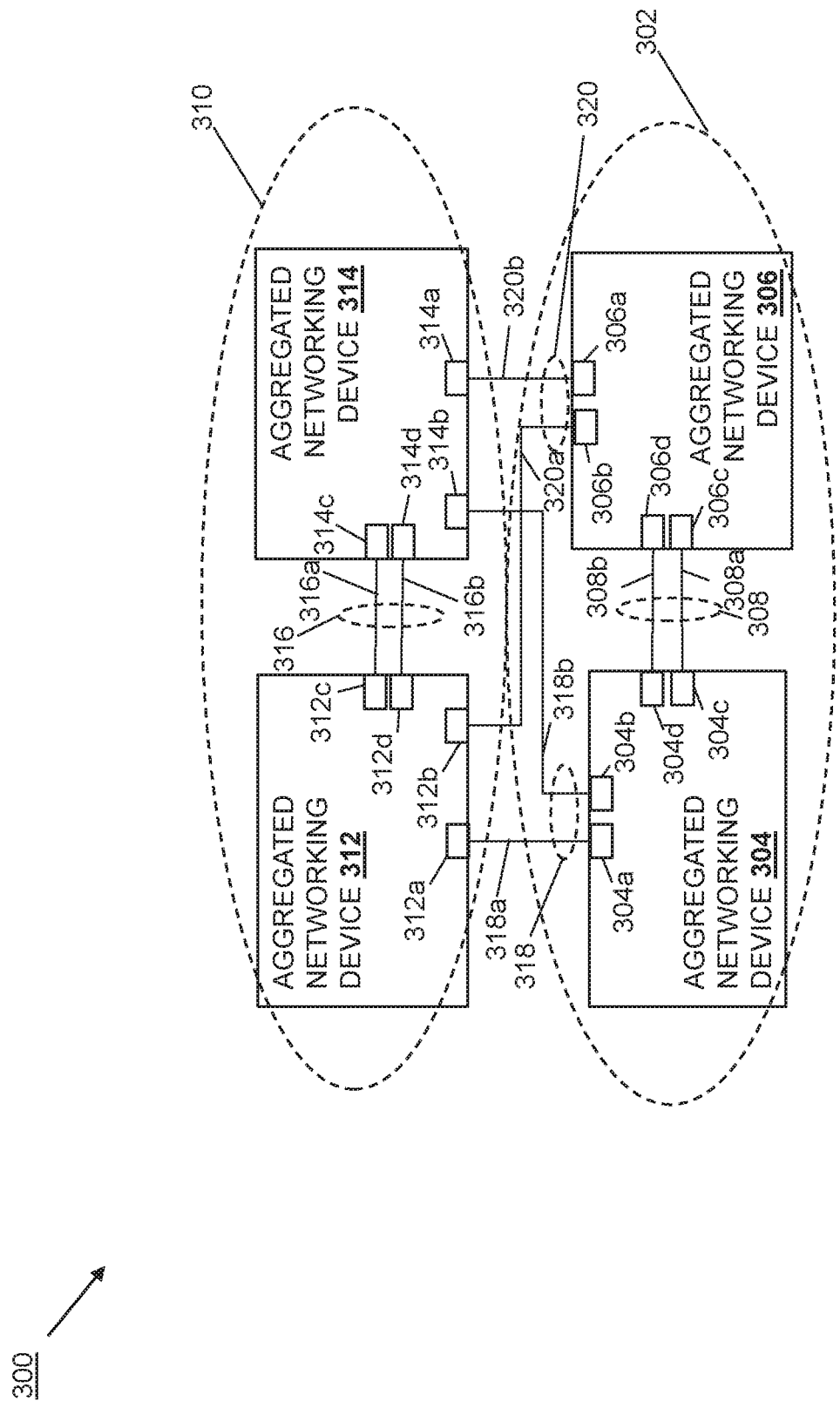
FIG. 3 is a schematic view illustrating an embodiment of a spanning tree enabled link aggregation system.

Referring now to FIG. 3, an embodiment of a spanning tree enabled link aggregation system 300 is illustrated. In the illustrated embodiment, the spanning tree enabled link aggregation system 300 provides an example of a square topology networking device configuration. As illustrated, the spanning tree enabled link aggregation system 300 includes a link aggregation domain 302 that is provided by a pair of aggregated networking devices 304 and 306 that are coupled together by one or more inter-networking-device links (e.g., inter-networking-device link 308a between a port 304c on the aggregated networking devices 304 and a port 306c on the aggregated networking devices 306, and inter-networking-device link 308b between a port 304d on the aggregated networking devices 304 and a port 306d on the aggregated networking devices 306) that have been aggregated into an Inter-Chassis Link (ICL) 308. In an embodiment, either or both of the aggregated networking devices 304 and 306 may be provided by the IHS 100 discussed above with reference to FIG. 1, and/or may include some or all of the components of the IHS 100. For example, the aggregated networking devices 304 and 306 may be provided by any of a variety of aggregated switch devices that would be apparent to one of skill in the art in possession of the present disclosure.

In the illustrated embodiment, the spanning tree enabled link aggregation system 300 also includes a link aggregation domain 310 that is provided by a pair of aggregated networking devices 312 and 314 that are coupled together by one or more inter-networking-device links (e.g., inter-networking-device link 316a between a port 312c on the aggregated networking devices 312 and a port 314c on the aggregated networking devices 314, and inter-networking-device link 316b between a port 312d on the aggregated networking devices 312 and a port 314d on the aggregated networking devices 314) that have been aggregated into an Inter-Chassis Link (ICL) 316. In the illustrated embodiment, the aggregated networking device 312 is coupled to the aggregated networking device 304 by at least one link 318a between a port 312a on the aggregated networking devices 312 and a port 304a on the aggregated networking devices 304, and the aggregated networking device 314 is coupled to the aggregated networking device 304 by at least one link 318b between a port 314b on the aggregated networking devices 314 and a port 304b on the aggregated networking devices 304, with the links 318a and 318b having been aggregated into a Link Aggregation Group (LAG) 318 between the aggregated networking device 304 and the link aggregation domain 310.

Similarly, in the illustrated embodiment, the aggregated networking device 312 is coupled to the aggregated networking device 306 by at least one link 320a between a port 312b on the aggregated networking devices 312 and a port 306b on the aggregated networking devices 306, and the aggregated networking device 314 is coupled to the aggregated networking device 306 by at least one link 320b between a port 314a on the aggregated networking devices 314 and a port 306a on the aggregated networking devices 306, with the links 320a and 320b having been aggregated into a Link Aggregation Group (LAG) 320 between the aggregated networking device 306 and the link aggregation domain 310. In an embodiment, either or both of the aggregated networking devices 312 and 314 may be provided by the IHS 100 discussed above with reference to FIG. 1, and/or may include some or all of the components of the IHS 100. For example, the aggregated networking devices 312 and 314 may be provided by any of a variety of aggregated switch devices that would be apparent to one of skill in the art in possession of the present disclosure.

In a specific example, the spanning tree enabled link aggregation system 300 may utilize the VLT protocol, which as discussed above is a proprietary aggregation protocol available in switch devices provided by DELL® Inc. of Round Rock, Tex., United States, and operates to provide a redundant, load-balancing connection in a loop-free environment that eliminates the need to use the STP, as well as including other VLT functionality known in the art. However, as discussed above, the STP may still be implemented in various VLT topologies. As such, with reference to FIG. 3, the link aggregation domain 302 may provide a VLT domain, with the aggregated networking devices 304 and 306 provided by VLT peer devices that are coupled together via the ICL 308 provided by a VLT interconnect (VLTi). Similarly, the link aggregation domain 310 may provide a VLT domain, with the aggregated networking devices 312 and 314 provided by VLT peer devices that are coupled together via the ICL 316 provided by a VLT interconnect (VLTi), and with the LAGs 318 and 320 provided by a VLT LAG that couples the VLT peer devices in the link aggregation domain 310 to the VLT peer devices in the link aggregation domain 302.

In the examples provided below, the aggregated networking device 312 is described as operating as a primary VLT peer device, and the aggregated networking device 314 is described as operating as a secondary VLT peer device. Similarly, the aggregated networking device 304 may be described as operating as the primary VLT peer device for the link aggregation domain 302, and the aggregated networking device 306 may be described as operating as the secondary VLT peer device for the link aggregation domain 302. Also, in the examples provided below, the aggregated networking device 312 is described as operating as a root bridge designated by the STP. However, one of skill in the art in possession of the present disclosure will appreciate that the aggregated networking device 314/secondary VLT peer device may perform the functionality described below for the aggregated networking device 312/primary VLT peer device while remaining within the scope of the present disclosure as well. Furthermore, while a specific spanning tree enabled link aggregation system 300 has been illustrated and described, one of skill in the art in possession of the present disclosure will recognize that the spanning tree enabled link aggregation system of the present disclosure may include a variety of components and component configurations while remaining within the scope of the present disclosure as well.

Figure 4:
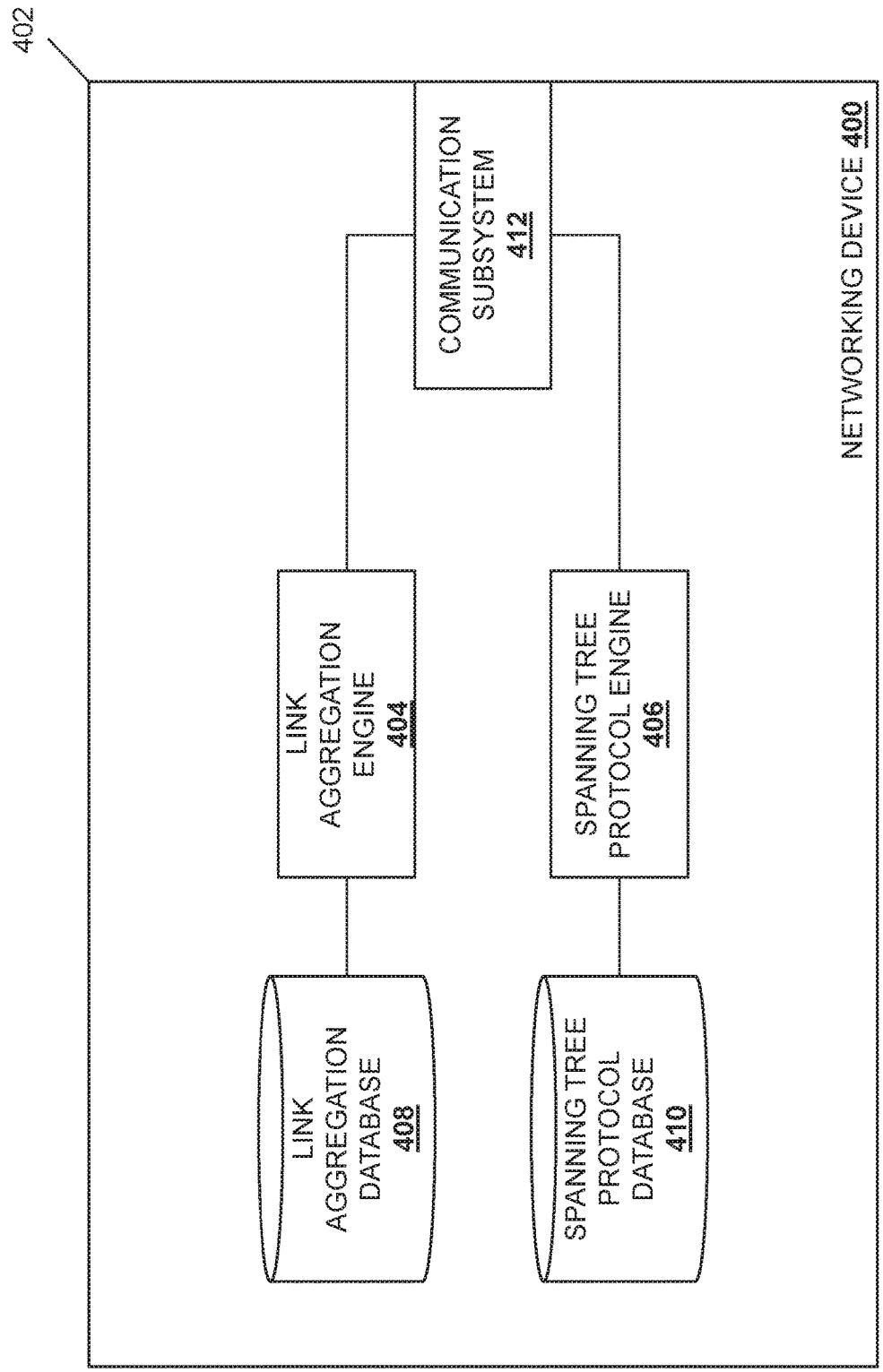
FIG. 4 is a schematic view illustrating an embodiment of an aggregated networking device that may be provided in the spanning tree enabled link aggregation systems of FIGS. 2 and 3.

Referring now to FIG. 4, an embodiment of an aggregated networking device 400 is illustrated that may be any of the aggregated networking devices 206 and 208 discussed above with reference to FIG. 2, and/or any of the aggregated networking devices 304, 306, 312, and 314 discussed above with reference to FIG. 3. As such, the aggregated networking device 400 may be provided by the IHS 100 of FIG. 1 and/or may include some or all of the components of the IHS 100, and in specific embodiments may be a VLT node device such as a switch device providing a VLT peer device. In the illustrated embodiment, the aggregated networking device 400 includes a chassis 402 that houses the components of the aggregated networking device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a link aggregation engine 404 and an spanning tree protocol engine 406 that are configured to perform the functions of the link aggregation engines, spanning tree protocol engines, and aggregated networking devices discussed below. In some embodiments, the link aggregation engine 404 may be a VLT engine that is configured to perform VLT operations. However, one of skill in the art in possession of the present disclosure will recognize that other link aggregation engines that operate according to other link aggregation protocols may fall within the scope of the present disclosure as well.

The chassis 402 may also house a storage system (not illustrated, but which may include the storage device 108 discussed above with reference to FIG. 1) that is coupled to the link aggregation engine 404 and the spanning tree protocol engine 406 (e.g., via a coupling between the storage system and the processing system), and that includes a link aggregation database 408 and a spanning tree protocol database 410 that store data for performing the functionality discussed below. The chassis 402 may also house a communication subsystem 412 that is coupled to the link aggregation engine 404 and the spanning tree protocol engine 406 (e.g., via a coupling between the communication subsystem and the processing system) and that may include a Network Interface Controller (NIC), a wireless communication device (e.g., a BLUETOOTH® communication device, a Near Field Communication (NFC) device, and/or other wireless communications devices known in the art), and/or other communication components known in the art. As such, the communication subsystem may include the ports utilized to provide the links, LAGs, ICLs, and/or other communication connections discussed above with reference to FIGS. 2 and 3. While a specific embodiment of an aggregated networking device 400 is illustrated and described, one of skill in the art in possession of the present disclosure will recognize that other components may be included in the aggregated networking device 400 to provide conventional link aggregation node device functionality (e.g., switching functionality), as well as the functionality discussed below, while remaining within the scope of the present disclosure.

With reference to FIGS. 2, 3 and 4, in the embodiment of the method 500 described in the example below, the conventional Spanning Tree Protocol (STP) is provided on each of the plurality of aggregated networking devices 206/400, 208/400, 304/400, 306/400, 312/400, and 314/400, and the spanning tree protocol engine 406 in each aggregated networking device 206/400, 208/400, 304/400, 306/400, 312/400, and 314/400 enables the use of the conventional spanning tree protocol in the spanning tree enabled link aggregation system 200 without introducing the problems discussed above. However, this embodiment is described in an attempt to provide a clear understanding of the teachings of the present disclosure, and one of skill in the art in possession of the present disclosure will recognize that the functionality of the conventional spanning tree protocol and the spanning tree protocol engine 406 of the present disclosure may be combined into a single engine (e.g., a spanning tree protocol engine) that performs the functionality described below while remaining within the scope of the present disclosure. Furthermore, one of skill in the art in possession of the present disclosure will recognize that some or all of the functionality of the conventional spanning tree protocol, the link aggregation engine 404, and the spanning tree protocol engine 406 may be provided on other devices in the spanning tree enabled link aggregation system 200/300 while remaining within the scope of the present disclosure as well. For example, the conventional spanning tree protocol, the link aggregation engine 404, and/or the spanning tree protocol engine 406 may be provided on the TOR networking device 202 of FIG. 2, or any other switch device, while remaining within the scope of the present disclosure.

Figure 5:
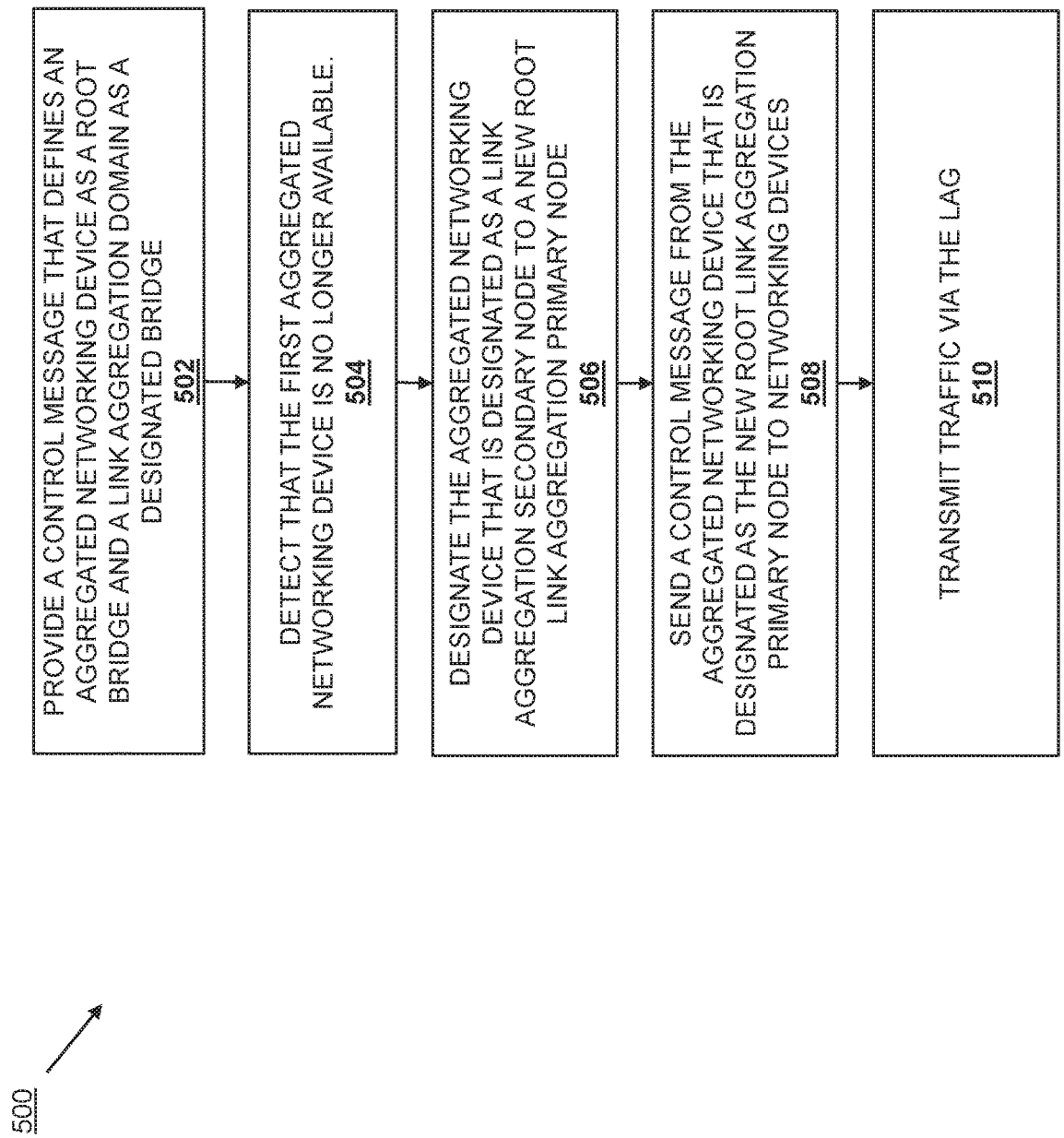
FIG. 5 is a flow chart illustrating an embodiment of a method for performing recovery operations in a spanning tree enabled link aggregation system when a root link aggregation primary node becomes unavailable.

Referring now to FIG. 5, an embodiment of a method 500 for performing recovery operations in a spanning tree enabled link aggregation system when an aggregated networking device becomes unavailable is illustrated. As discussed below, the systems and methods of the present disclosure provide a modified spanning tree protocol that operates to cause an aggregated networking device that is included in a link aggregation domain and that is designated as a root link aggregation primary node to communicate first control messages (e.g., Bridging Protocol Data Units (BPDUs)) to networking devices that are coupled to the link aggregation domain. The first control messages may define the link aggregation domain to which the aggregated networking device belongs as a designated bridge, and define the aggregated networking device that designated as the root link aggregation primary node as a root bridge. One of skill in the art in possession of the present disclosure will recognize that conventional control messages sent by a root link aggregation primary node typically associate a designated bridge identifier with a MAC address of a networking device (e.g., the MAC address of the aggregated networking device) designated as the root link aggregation primary node.

However, in the systems and methods of the present disclosure, defining the designated bridge identifier as a link aggregation domain identifier (e.g., a VLT domain MAC address) of the link aggregation domain allows an aggregated networking device that transitions from operating as a link aggregation secondary node to operating as the root link aggregation primary node (e.g., when the aggregated networking device operating as the link aggregation primary node that was operating as the root link aggregation primary node becomes unavailable) to transmit second control messages to the networking devices that include new root information. Furthermore, that new root information in the second control messages may associate the designated bridge identifier with the link aggregation domain identifier, and the root node identifier with an aggregated networking device identifier for the aggregated networking device that is becoming the new root link aggregation primary node. As such, the networking devices will accept this new root information immediately, because the second control messages have the same designated bridge identifier as the first control messages that were provided by the aggregated networking device that was previously operating as the root link aggregation primary node.

In situations where the aggregated networking device that is becoming the new root link aggregation primary node is coupled to the networking device via more than one LAG, the second control messages may be provided via a link that is a member of a LAG that is included in the more than one LAG, and that is designated as an alternate link before sending the second control messages on active links included in the more than one LAG. Furthermore, the new root link aggregation primary node may redirect any control messages that include old root information that is received on alternate links back through those alternate links to the networking devices that send it. As such, one of skill in the art in possession of the present disclosure will recognize how the teachings provided herein operate to minimize traffic loss during root convergence when the root link aggregation primary node becomes unavailable.

The method 500 begins at block 502 where an aggregated networking device included in a link aggregation domain provides a control message that defines the aggregated networking device as a root bridge and the link aggregation domain as a designated bridge. in some embodiments, prior to block 502, an aggregated networking device in the link aggregation domain 204/310 may be designated a primary aggregated networking device (e.g., a primary VLT node) or a secondary aggregated networking device (e.g., a secondary VLT node). In such embodiments, the spanning tree protocol engine included in the primary aggregated networking device may control the role/state for members of a LAG (i.e., "VLT LAG members") in order to control, for example, whether VLT LAG members that provide the VLT LAG perform forwarding operations, blocking operations, designated roles, alternate roles, and/or other port roles/states known in the art, and may propagate those port roles/states to the secondary aggregated networking device connected to the VLT LAG. As such, the port role/state for VLT LAG members included in a VLT LAG will remain consistent across all of the VLT LAG members on the aggregated networking devices that are connected to that VLT LAG. Furthermore, the spanning tree protocol engine included in the aggregated networking devices may operate to ensure that each of the VLT LAGs is visible to the spanning tree protocol engine operating in the spanning tree enabled link aggregation system 200/300 such that each spanning tree protocol engine is aware of those VLT LAGs, which will allow a primary aggregated networking device to control the port role/state for that VLT LAG. As such, even VLT LAGs that have no links (and even no local port-channel) connected an aggregated networking device will be visible to that aggregated networking device. When control messages are received on a VLT LAG, they may be provided in an object and published to the group of the aggregated networking devices in the link aggregation domain, which allows the primary aggregated networking device to receive the control message (i.e., from the secondary aggregated networking device) even if the primary aggregated networking device does not have a VLT LAG member.

In an embodiment, at block 502 and referring the spanning tree enabled link aggregation system 200 of FIG. 2, the spanning tree protocol engine 406 of the aggregated networking device 206 may designate the aggregated networking device 206 as the root bridge during root convergence, and the link aggregation engine 404 may operate to elect the aggregated networking device 206 as the primary aggregated networking device in the link aggregation domain 204. As such, the aggregated networking device 206 may be considered a "root link aggregation primary node", and the aggregated networking device 208 may be considered a "link aggregation secondary node". In an embodiment, at block 502, the spanning tree protocol engine 406 in the aggregated networking device 206 may provide a control message (e.g., a BPDU) to the TOR networking device 202 that may indicate that the link aggregation domain 204 is a designated bridge and the aggregated networking device 206 is a root bridge. For example, the control message may include a designated bridge identifier field and a root bridge identifier field, and the spanning tree protocol engine 406 may provide a link aggregation domain identifier (e.g., a VLT domain MAC) for the link aggregation domain 204 as a value in the designated bridge identifier field, and an aggregated networking device identifier (e.g., a MAC address) for the aggregated networking device 206 as a value in the root bridge identifier field. While specific control information has been described, one of skill in the art in possession of the present disclosure will appreciated that the control message may include other information (e.g., information provided in conventional BPDUs) while remaining within the scope of the present disclosure as well.

Figure 6A:
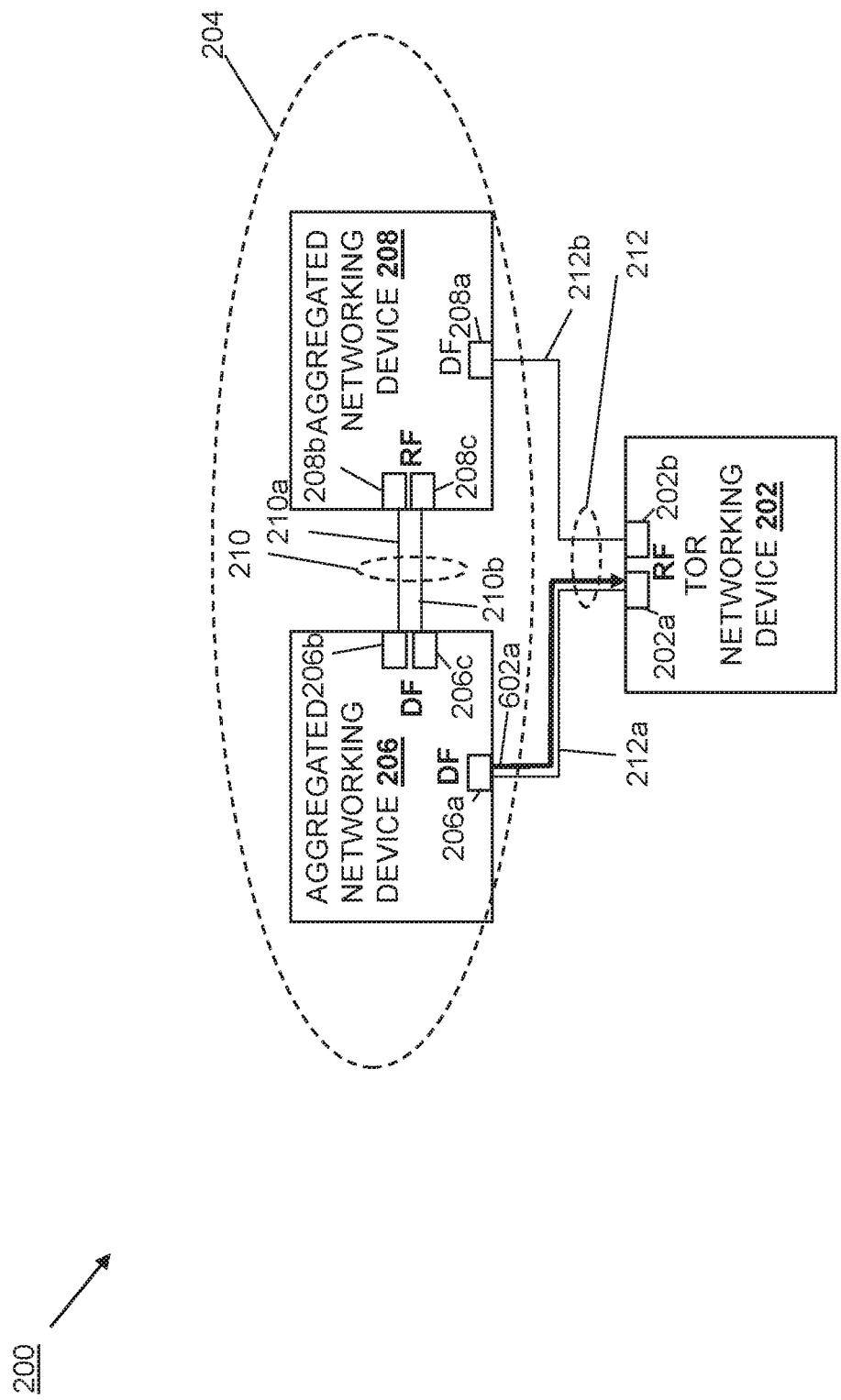
FIG. 6A is a schematic view illustrating an embodiment of the spanning tree enabled link aggregation system of FIG. 2 during the method of FIG. 5.

Referring to FIG. 6A, an example of the performance of block 502 in the spanning tree enabled link aggregation system 200 is illustrated. In the example illustrated in FIG. 6A, the aggregated networking device 206 that is designated as the root link aggregation primary node may transmit a control message 602a via the link 212a to the TOR networking device 202, with the control message 602a identifying the link aggregation domain 204 as the designated bridge and the aggregated networking device 206 as the root bridge. Furthermore, the spanning tree protocol engine 406 in the aggregated networking device 206/400 may also define its ports 206a, 206b, and 206c to be in a designated role and a forwarding state ("DF"). Also, the spanning tree protocol engine 406 in the aggregated networking device 206/400 may define all of the VLT LAG that are included on the aggregated networking device 208 such as port 208a to be in a designated role and a forwarding state ("DF") and send the role and state to the aggregated networking device 208/400 for hardware programming. The spanning tree protocol engine 406 of the aggregated networking device 208/400 may define non-VLT ports such as its ports 208b and 208c to be in a root role and the forwarding state ("RF"). Further still, the spanning tree protocol engine 406 of the TOR networking device 202 may define the ports 202a and 202b to be in the root role and forwarding state.

In an embodiment of block 502, and with reference to the spanning tree enabled link aggregation system 300 of FIG. 3, the spanning tree protocol engine 406 of the aggregated networking device 312 may designate the aggregated networking device 312 as the root bridge during root convergence, and the link aggregation engine 404 may elect the aggregated networking device 312 as the primary aggregated networking device in the link aggregation domain 310. As such, the aggregated networking device 312 may be referred to as the "root link aggregation primary node", and the aggregated networking device 314 may be designated as the link aggregation secondary node. The spanning tree protocol engine 406 in the aggregated networking device 312/400 may then provide a control message (e.g., a BPDUs) to the aggregated networking device 304, the aggregated networking device 306, and the aggregated networking device 314, with the control messages defining that the link aggregation domain 310 is the designated bridge by using the VLT MAC of the link aggregation domain 310 configured by the user and the aggregated networking device 312 is the root bridge. For example, the control messages may include a designated bridge identifier field and a root bridge identifier field, and the spanning tree protocol engine 406 may provide a link aggregation domain identifier (e.g., a VLT MAC) for the link aggregation domain 310 as a value in the designated bridge identifier field, and an aggregated networking device identifier (e.g., a MAC) for the aggregated networking device 312 as a value in the root bridge identifier field. As will be appreciated by one of skill in the art in possession of the present disclosure, the control message may include other information (e.g., information provided in conventional BPDUs) while remaining within the scope of the present disclosure as well.

Figure 6B:
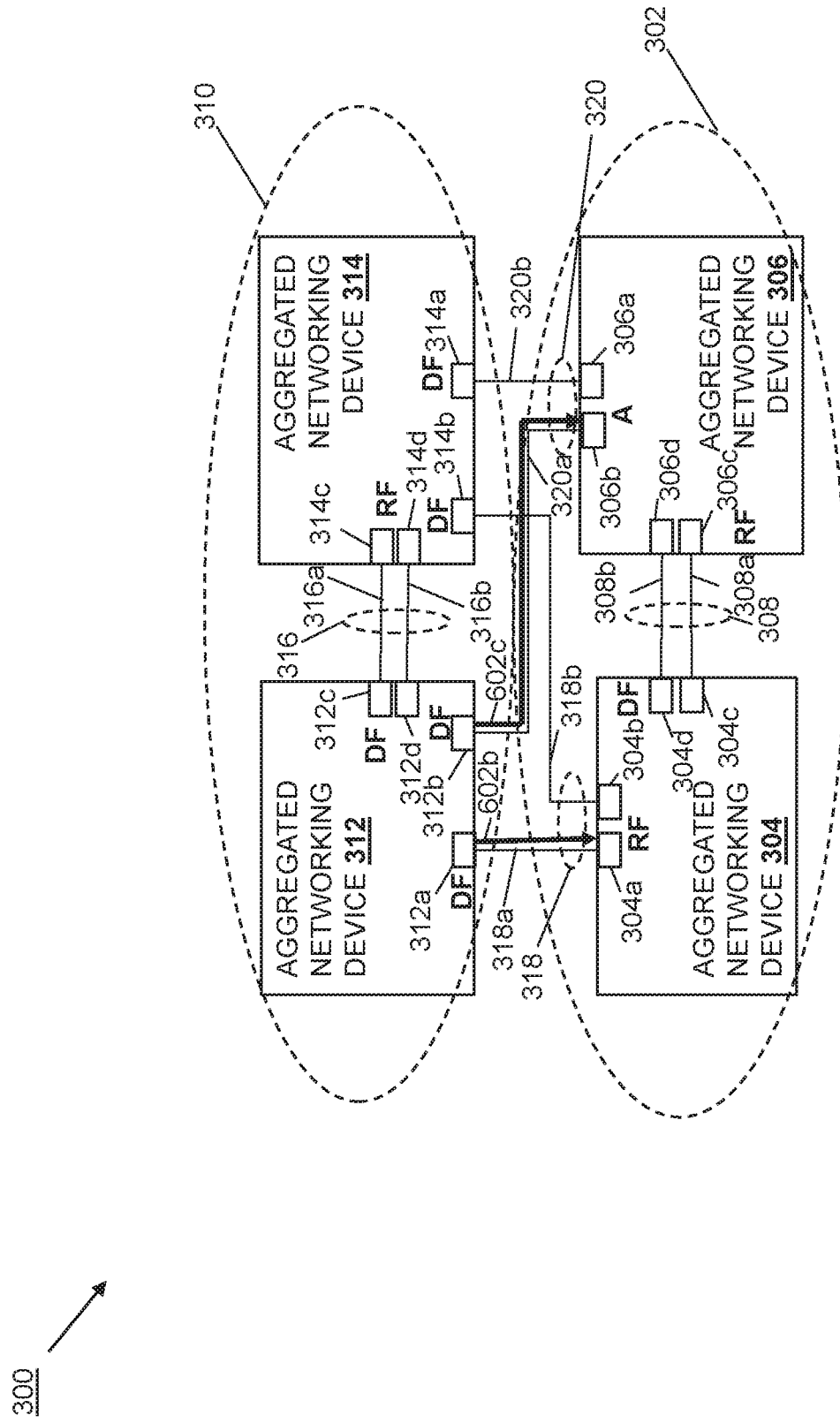
FIG. 6B is a schematic view illustrating an embodiment of the spanning tree enabled link aggregation system of FIG. 3 during the method of FIG. 5.

Referring to FIG. 6B, an example of the performance of block 502 in the spanning tree enabled link aggregation system 300 is illustrated. In the example illustrated in FIG. 6B, the aggregated networking device 312 that is designated as the root link aggregation primary node may transmit a control message 602b via the link 318a to the aggregated networking device 304, and may transmit a control message 602c via the link 320a to the aggregated networking device 306. Each of the control messages 602b and 602c may define the link aggregation domain 310 as the designated bridge, and may define the aggregated networking device 312 as the root bridge. The aggregated networking device 312 may also transmit control message to the aggregated networking device 314. Furthermore, the spanning tree protocol engine 406 in the aggregated networking device 312/400 may define its ports 312a, 312b, 312c, and 312d to be in the designated role and the forwarding state and may define the ports 314a and 314b that are included in a LAG in the aggregated networking device 314 to be in the designated role and the forwarding state. The spanning tree protocol engine 406 in the aggregated networking device 314/400 may define its ports 314c and 314d to be in the root role and the forwarding state. Further still, the spanning tree protocol engine 406 in the aggregated networking device 304/400 may define its ports 304a and 304b to be in the designated role and the forwarding state, and may define its ports 304c and 304d to be in the root role and the forwarding state, while the spanning tree protocol engine 406 in the aggregated networking device 306/400 may define its ports 306a and 306b to be in an alternate role and a blocking port state ("A"), and may define its ports 306c and 306d to be in the root role and the forwarding state.

Figure 7A:
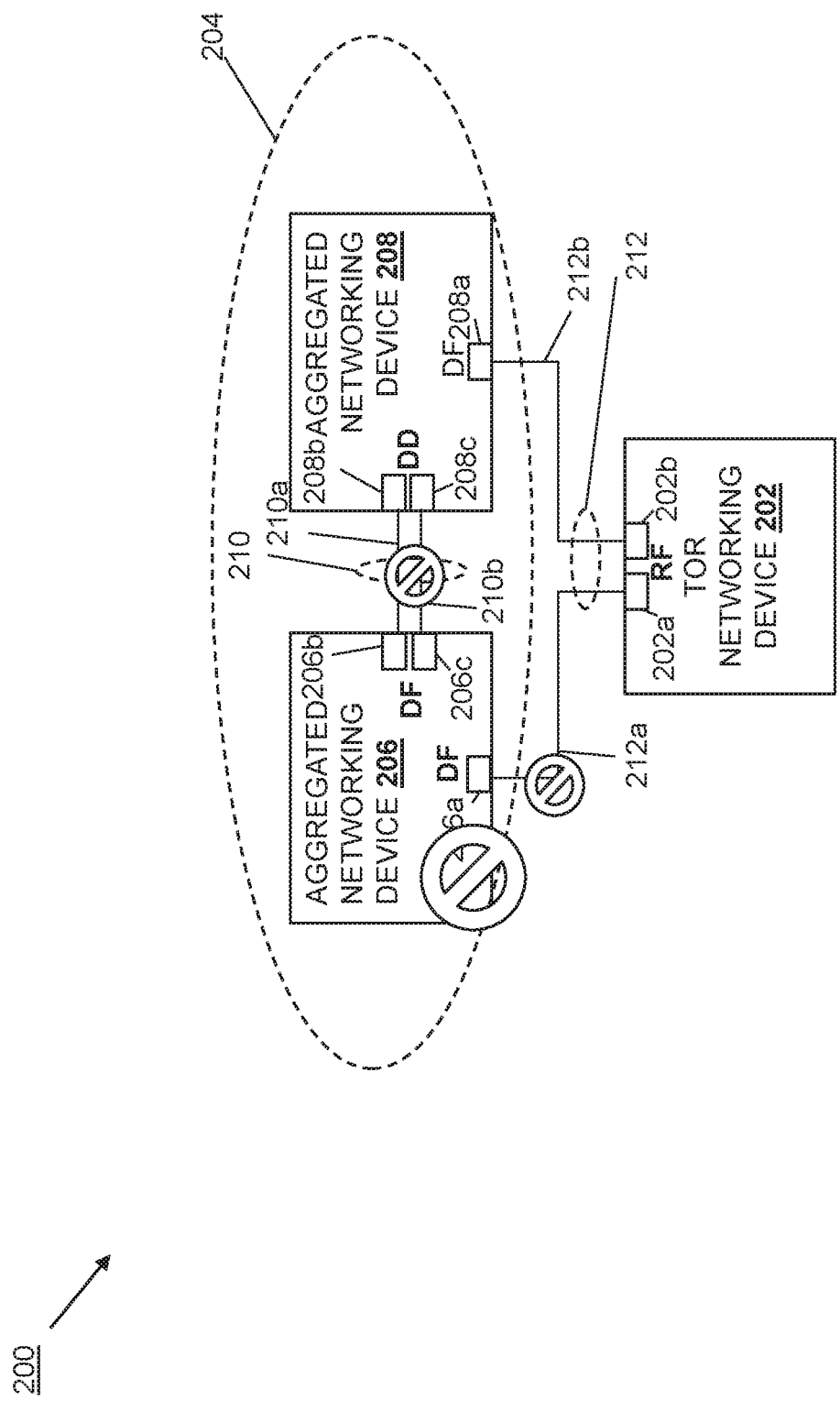
FIG. 7A is a schematic view illustrating an embodiment of the spanning tree enabled link aggregation system of FIG. 2 during the method of FIG. 5.

The method 500 may then proceed to block 504 where it is detected that the first aggregated networking device is no longer available. In an embodiment, at block 504 and with reference to the spanning tree enabled link aggregation system 200 of FIG. 2, the aggregated networking device 208 may determine that the aggregated networking device 206 is no longer available. For example, during operation, the aggregated networking device 206 may fail, may undergo a restart, may undergo an upgrade, and/or may experience any other event that may prevent the aggregated networking device 206 from transmitting data traffic in the spanning tree enabled link aggregation system 200. As a result, the link 212a in the LAG 212 between the aggregated networking device 206 and the TOR networking device 202 may become unavailable, and the ICL 210 may become unavailable. In an embodiment, at block 504, the aggregated networking device 208 acting as the link aggregation secondary node may detect the unavailability of the aggregated networking device 206 by determining that the ICL 210 is unavailable. For example, before the aggregated networking device 206 goes for reload or upgrade, the aggregated networking device 206 informs the aggregated networking device 208 that it is going to be reloaded or upgraded. As a result, the aggregated networking device 208 starts acting as the root link aggregation primary node. In response, the aggregated networking device 208 may change the role/state of its ports 208b and 208c from a root role and a forwarding state to a disabled role and a discarding state. Referring now to FIG. 7A, an example of the performance of block 504 in the spanning tree enabled link aggregation system 200 is illustrated. In the example illustrated in FIG. 7A, the aggregated networking device 206 that is designated as the root link aggregation primary node has become unavailable. As a result, the link 212a in the LAG 212 becomes unavailable, and the ICL 210 becomes unavailable. As discussed above, in response the spanning tree protocol engine 406 of the aggregated networking device 208 may change the designation of its ports 208b and 208c from a root forwarding state to the disabled role and discarding state ("DD").

Figure 7B:
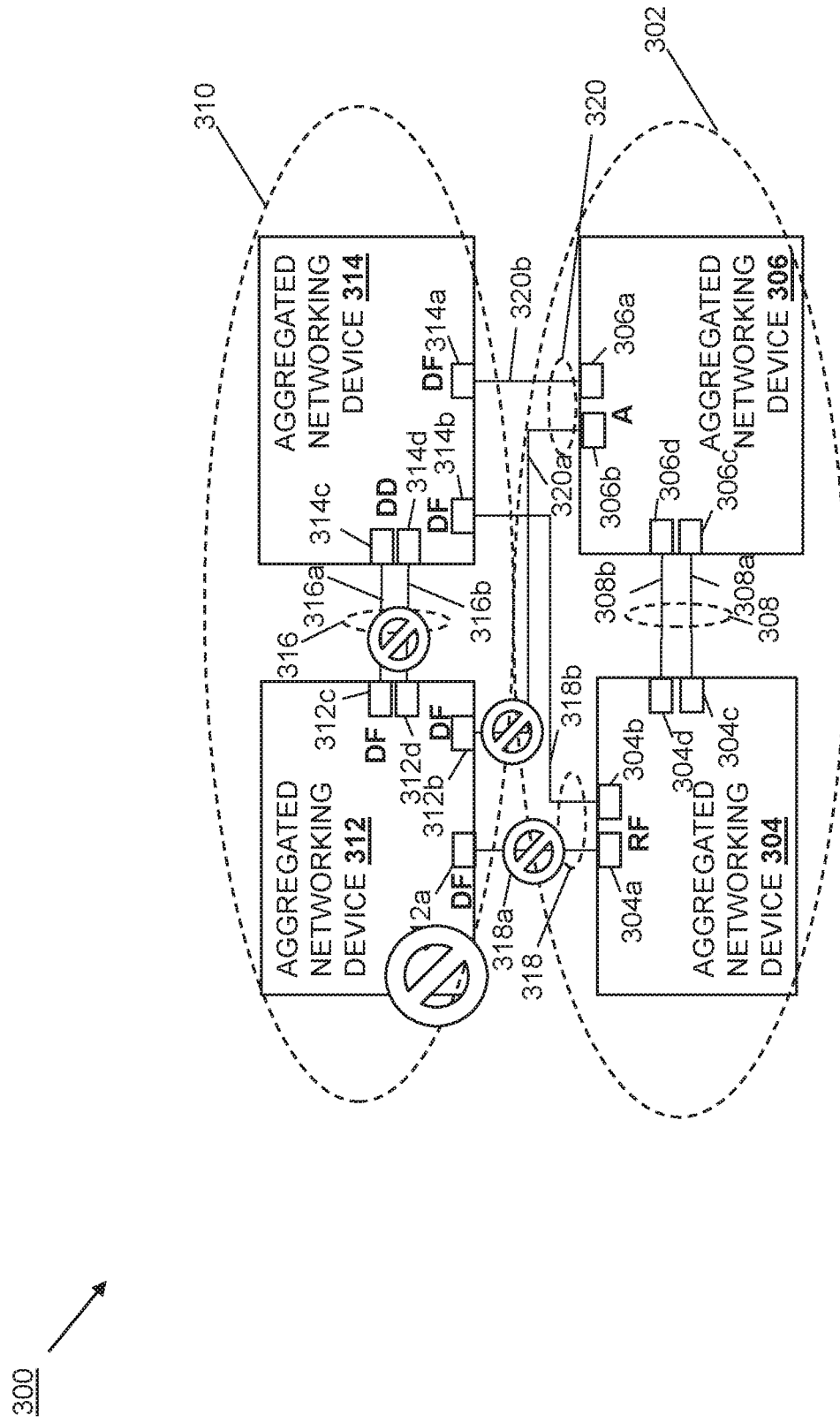
FIG. 7B is a schematic view illustrating an embodiment of the spanning tree enabled link aggregation system of FIG. 3 during the method of FIG. 5.

In an embodiment, at block 504 and with reference to the spanning tree enabled link aggregation system 300 of FIG. 3, the aggregated networking device 314 may determine that the aggregated networking device 312 is no longer available. For example, during operation, the aggregated networking device 312 may fail, may undergo a restart, may undergo an upgrade, and/or may experience any other event that may prevent the aggregated networking device 312 from transmitting data traffic in the spanning tree enabled link aggregation system 300. As a result, the link 318a in the LAG 318 between the aggregated networking device 312 and the aggregated networking device 304 may be unavailable, and the ICL 316 may be unavailable. In addition, the link 320a in the LAG 320 between the aggregated networking device 312 and the aggregated networking device 306 may be unavailable as well. In an embodiment, at block 504, the aggregated networking device 314 acting as the link aggregation secondary node may detect the unavailability of the aggregated networking device 312 by determining that the ICL 316 is unavailable. In other examples, before the aggregated networking device 312 goes for reload or upgrade, the aggregated networking device 312 informs the aggregated networking device 314 that it is going to be reloaded or upgraded. As a result, the aggregated networking device 314 starts acting as the root link aggregation primary node. Referring now to FIG. 7B, an example of the performance of block 504 in the spanning tree enabled link aggregation system 300 is illustrated. In the example illustrated in FIG. 7B, the aggregated networking device 312 that is designated as the root link aggregation primary node has become unavailable. As a result, the link 318a in the LAG 318 becomes unavailable and the ICL 316 becomes unavailable and, in response, the spanning tree protocol engine 406 in the aggregated networking device 314 may change the designation of the ports 314c and 314d from the root role and the forwarding state to the disabled role and the discarding state.

The method 500 may then proceed to block 506 where an aggregated networking device that is designated as the link aggregation secondary node may be designated as a new root link aggregation primary node. In an embodiment, at block 506 and with reference to the spanning tree enabled link aggregation system 200 of FIG. 2, the spanning tree protocol engine 406 in the aggregated networking device 208/400 may designate the aggregated networking device 208 as a new root bridge. For example, the link aggregation engine 404 in the aggregated networking device 208 may operate at block 506 to designate the aggregated networking device 208 as the link aggregation primary node. A reload or upgrade event of the aggregated networking device 206 may be provided to the link aggregation engine 404 of the aggregated networking device 208, which will result in the link aggregation engine 404 assigning the primary role to the aggregated networking device 208. As such, following block 506, the aggregated networking device 208 is designated as a new root link aggregation primary node and may operate as a root link aggregation primary node.

In an embodiment, at block 506 and with reference to the spanning tree enabled link aggregation system 300 of FIG. 3, the spanning tree protocol engine 406 in the aggregated networking device 314/400 may designate the aggregated networking device 314 as a new root bridge. For example, the link aggregation engine 404 of the aggregated networking device 314 may operate at block 506 to designate the aggregated networking device 314 as the link aggregation primary node. As such, following block 506, the aggregated networking device 314 is designated as a new root link aggregation primary node and may operate as a root link aggregation primary node.

The method 500 then proceeds to block 508 where the aggregated networking device that is designated as the new root link aggregation primary node sends a control message that includes new root information to the networking devices coupled to that aggregated networking device/new root link aggregation primary node. In an embodiment, at block 508 and with reference to the spanning tree enabled link aggregation system 200 of FIG. 2, the spanning tree protocol engine 406 in the aggregated networking device 208/400 may send a control message that includes new root information to the TOR networking device 202, and the control message may define the aggregated networking device 208 as the root bridge and the link aggregation domain 204 as the designated bridge. For example, the control message may include a designated bridge identifier field and a root bridge identifier field, and the spanning tree protocol engine 406 of the aggregated networking device 208/400 may provide a link aggregation domain identifier (e.g., a VLT MAC) for the link aggregation domain 204 as a value in the designated bridge identifier field, and an aggregated networking device identifier (e.g., a MAC) for the aggregated networking device 208 as a value in the root bridge identifier field. As will be appreciated by one of skill in the art in possession of the present disclosure, the control message may include other information (e.g., information provided in conventional BPDUs) while remaining within the scope of the present disclosure as well.

As such, at block 508 the TOR networking device 202 may receive the control message that includes the new root information, and will operate to accept the new root information (e.g., the aggregated networking device identifier for the aggregated networking device 208 defined as the root bridge) because the control message from the aggregated networking device 208 defines the designated bridge as the link aggregation domain 204, which is the same as was defined by the control message that the aggregated networking device 206 provided the TOR networking device 202 in the original control message sent at block 502.

Figure 8:
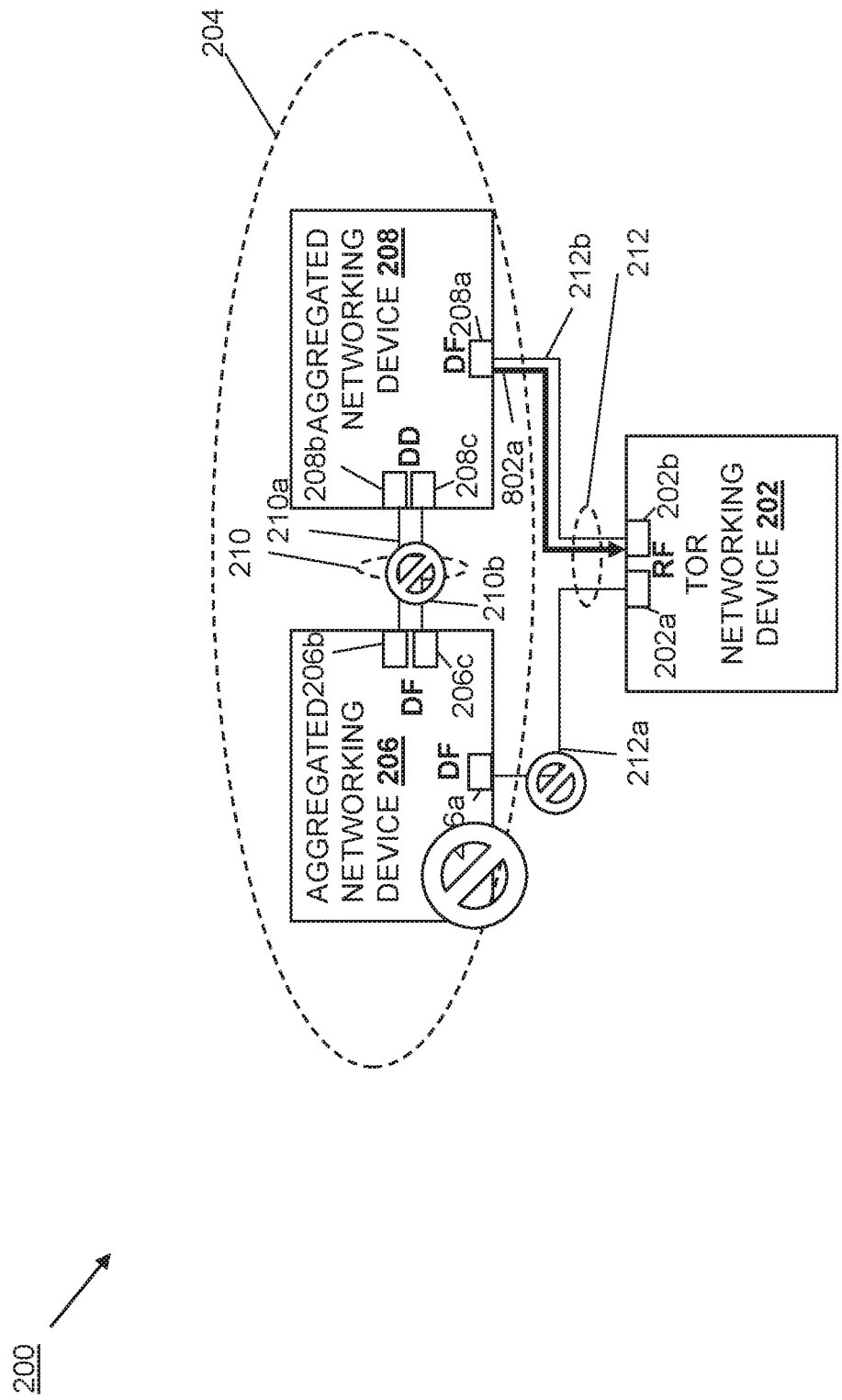
FIG. 8 is a schematic view illustrating an embodiment of the spanning tree enabled link aggregation system of FIG. 2 during the method of FIG. 5.

Referring now to FIG. 8, an example of the performance of block 510 in the spanning tree enabled link aggregation system 200 is illustrated. In the example illustrated in FIG. 8, when the link aggregation engine 404 in the aggregated networking device 208/400 transitions the role of the aggregated networking device 208 from a link aggregation secondary node to a link aggregation primary node due to the aggregated networking device 206 being unavailable and/or the ICL 210 being unavailable, the aggregated networking device 208 begins operating to control the LAG 212 and transmits a control message 802a that defines itself as a new root bridge and defines the link aggregation domain 204 as the designated bridge. The control message 802a may be transmitted on the link 212b to the TOR networking device 202, and the TOR networking device 202 may operate to accept the aggregated networking device identifier for the aggregated networking device 208 immediately as the root bridge because the designated bridge identifier (e.g., the link aggregation domain identifier for the link aggregation domain 204) in the control message 802a is the same as the designated bridge identifier that was received by the TOR networking device 202 in the control message 602a from the aggregated networking device 206 at block 502.

In an embodiment, at block 508 and with reference to the spanning tree enabled link aggregation system 300 of FIG. 3, the spanning tree protocol engine 406 in the aggregated networking device 314/400 may send a control message that include new root information. For example, the control message may define the aggregated networking device 314 as the root bridge and the link aggregation domain 310 as the designated bridge. In an embodiment, the control message may include a designated bridge identifier field and a root bridge identifier field, and the spanning tree protocol engine 406 in the aggregated networking device 314/400 may provide a link aggregation domain identifier (e.g., a VLT MAC) for the link aggregation domain 314 as a value in the designated bridge identifier field, and an aggregated networking device identifier (e.g., a MAC) for the aggregated networking device 314 as a value in the root bridge identifier field. As will be appreciated by one of skill in the art in possession of the present disclosure, the control message may include other information (e.g., information provided in conventional BPDUs) while remaining within the scope of the present disclosure as well.

In an embodiment of the spanning tree enabled link aggregation system 300 in which the aggregated networking device 314 is controlling a plurality of LAGs (e.g., the LAG 318 and the LAG 320), the aggregated networking device 314 may provide the control message with the new root information on any link that is designated as alternate link. For example, the aggregated networking device 314 may have previously received control messages (e.g., BPDUs) from the aggregated networking device 304 and the aggregated networking device 306. As such, the spanning tree protocol engine 406 in the aggregated networking device 314/400 may determine, from the control messages received from the aggregated networking device 304 and 306, the spanning tree port states of the ports 304b and 306a that are coupled to the aggregated networking device 314, and the spanning tree protocol engine 406 in the aggregated networking device 314/400 may store the spanning tree port role/states for each port connected to it in the spanning tree protocol database 410. In some embodiments, the spanning tree protocol engine 406 in the aggregated networking device 314/400 may use the spanning tree port role/states to derive whether each link (e.g., the link 318a and the link 320b) is an active link or an alternate link. As such, once the aggregated networking device 314 is designated as the root link aggregation primary node, the spanning tree protocol engine 406 in the aggregated networking device 314/400 may check each of its ports (e.g., the ports 314a-314d) to determine which ports are coupled to alternate links, and may then send the control message on each port that is coupled to an alternate link. In some embodiments, the spanning tree protocol engine 406 in the networking device 314/400 may send control messages on each alternate link before control messages are sent on active links.

When the networking device that is coupled to an alternate link receives a control message from the aggregated networking device 314 with the new root information, that networking device does not accept this new root information because it has "better" root information (e.g., root information from the control message that was provided by the aggregated network device 312 that was previously operating as the root link aggregation primary node) on the port that is designated in the root role and the forwarding state (i.e., the root port). As such, the spanning tree protocol engine 406 in that networking device may attempt to redefine the port that is coupled to the alternate link and that is defined as having the alternate role and the blocking state to having the designated role and the forwarding state. However, to prevent the redefinition from the alternate role blocking state to the designated role forwarding state, the spanning tree protocol engine 406 in the aggregated networking device 314/400 may operate to monitor alternate links for control messages that include the old root information (e.g., root information that defines the aggregated networking device 312 as the root bridge), and the spanning tree protocol engine 406 in the aggregated networking device 314/400 may redirect the control messages that include such old root information back through the alternate link on which it arrived. As will be appreciated by one of skill in the art in possession of the present disclosure, the redirection of the control messages via the alternate link on which the control message is received by the aggregated networking device 314 may cause the port role/state to be defined as a backup role and the blocking state, and such redirections may ensure that alternate links remain in a blocking state until the new root information is circulated to all of the ports on the aggregated networking devices 304 and 306. As discussed above, if the port coupled to the alternate link is allowed to change from a blocking state to a forwarding state, traffic loss will occur for an undesirable duration.

Following the expiration of the old root information provided for the root forwarding ports, the ports on the networking devices that are coupled to the active links and that are defined with a root role and the forwarding state will send a control messages to the aggregated networking device 314 with the designated role and a blocking state. When the aggregated networking device 314 receives the control messages on the active link, the aggregated networking device 314 may send a control message with a role of designated, a state of blocking, and a proposal flag set. As will be appreciated by one of skill in the art in possession of the present disclosure, the port will be in the forwarding state both in software and hardware, by conveying a blocking state in the control message allows the networking device coupled to the aggregated networking device to change the ports coupled to the active links to a disputed role in cases where the networking device is the next best root.

The control message from the networking device 314 via the active links may also include the new root information that causes the networking devices to accept the new root information that provides the aggregated networking device 314 defined as the new root link aggregation primary node. In some embodiments, the aggregated networking device 314 may stop the redirection of the control messages on the alternate link when it receives a control message from the networking devices via the active and alternate links that advertises the aggregated networking device 314 as the root bridge. However, in other embodiments, the aggregated networking device 314 may stop the redirection of the control messages on the alternate link when the aggregated networking device 314 sends control messages on the active links. Subsequently, the aggregated networking device 314 may provide a control message to the networking device that includes the new port information on the alternate link. Upon receiving the control message with the new port information, the networking device defines the port coupled to that alternate link to be in the alternate role and the blocking state.

Referring now to FIGS. 9A-9D, an example of the performance of block 508 in the spanning tree enabled link aggregation system 300 is illustrated. In the example illustrated in FIG. 9A, when the link aggregation engine 404 in the aggregated networking device 314/400 transitions the role of the aggregated networking device 314 from a link aggregation secondary node to a link aggregation primary node (due to the aggregated networking device 312 being unavailable and/or the ICL 316 being unavailable), the aggregated networking device 314 starts controlling the LAGs 318 and 320, and transmits a control message 902 that defines itself as a new root bridge, and that defines the link aggregation domain 310 as the designated bridge. In an embodiment, the control message 902 may be transmitted on the link 320b to the aggregated networking device 306 before being transmitted on the link 318b, as the link 320b is an alternate link while the link 318b is an active link. As discussed above, transmitting the control message first on the link 320b ensures that the port 306a maintains its blocking state status and does not change to a forwarding state when aggregated networking device 314 advertises the new root information. As such, the aggregated networking device 306 may receive the control message 902, and the spanning tree protocol engine 406 in the aggregated networking device 306/400 may not accept the new root information due to the aggregated networking device 304 having "better" root information on the port 304b, which is the old root information that was received from the aggregated networking device 312 at block 502. As such, the spanning tree protocol engine 406 in the aggregated networking device 306/400 defines the port 306a with the designated role and the blocking state ("DB").

Figure 9A:
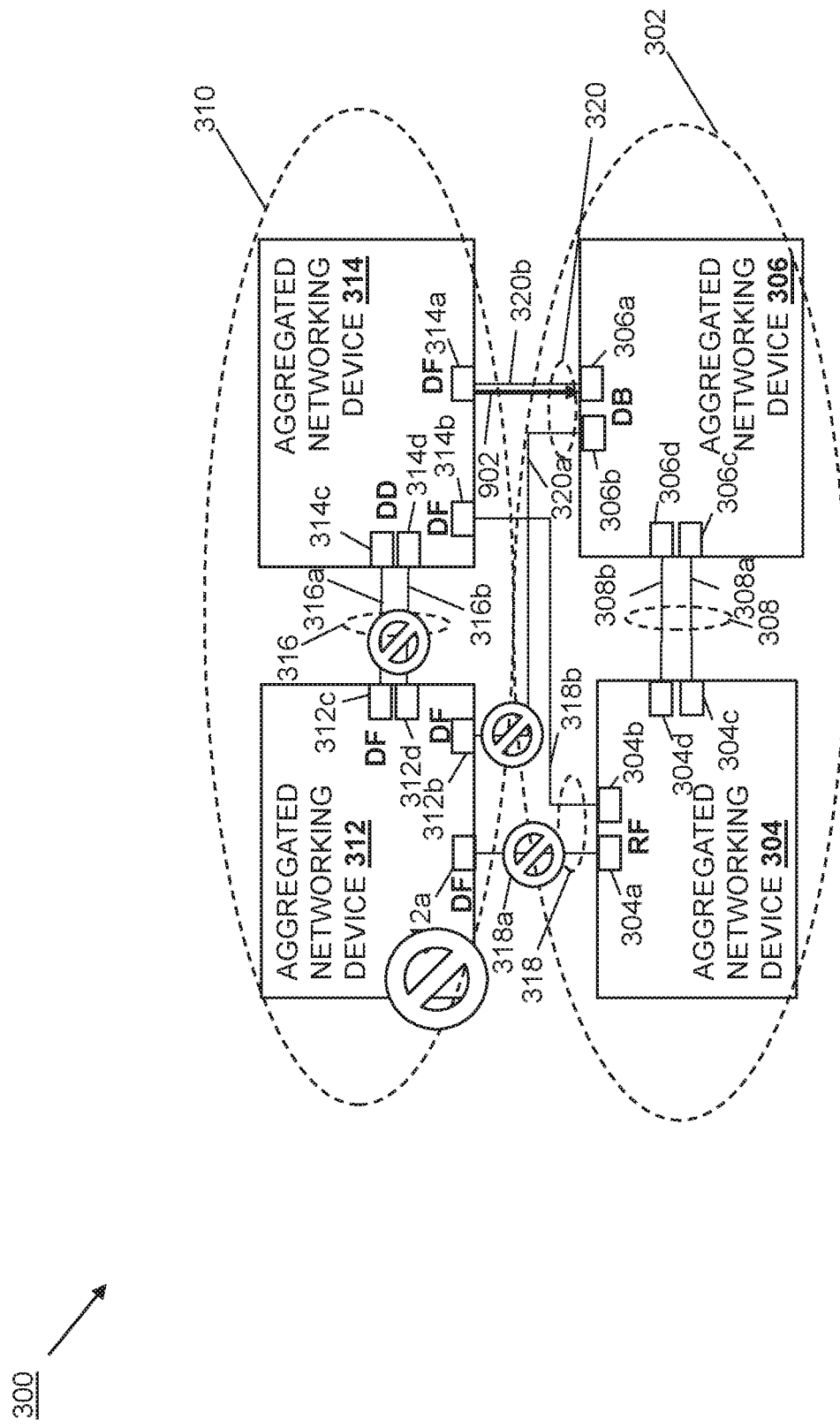
FIGS. 9A-9D are schematic views illustrating an embodiment of the spanning tree enabled link aggregation system of FIG. 3 during the method of FIG. 5.
Figure 9B:
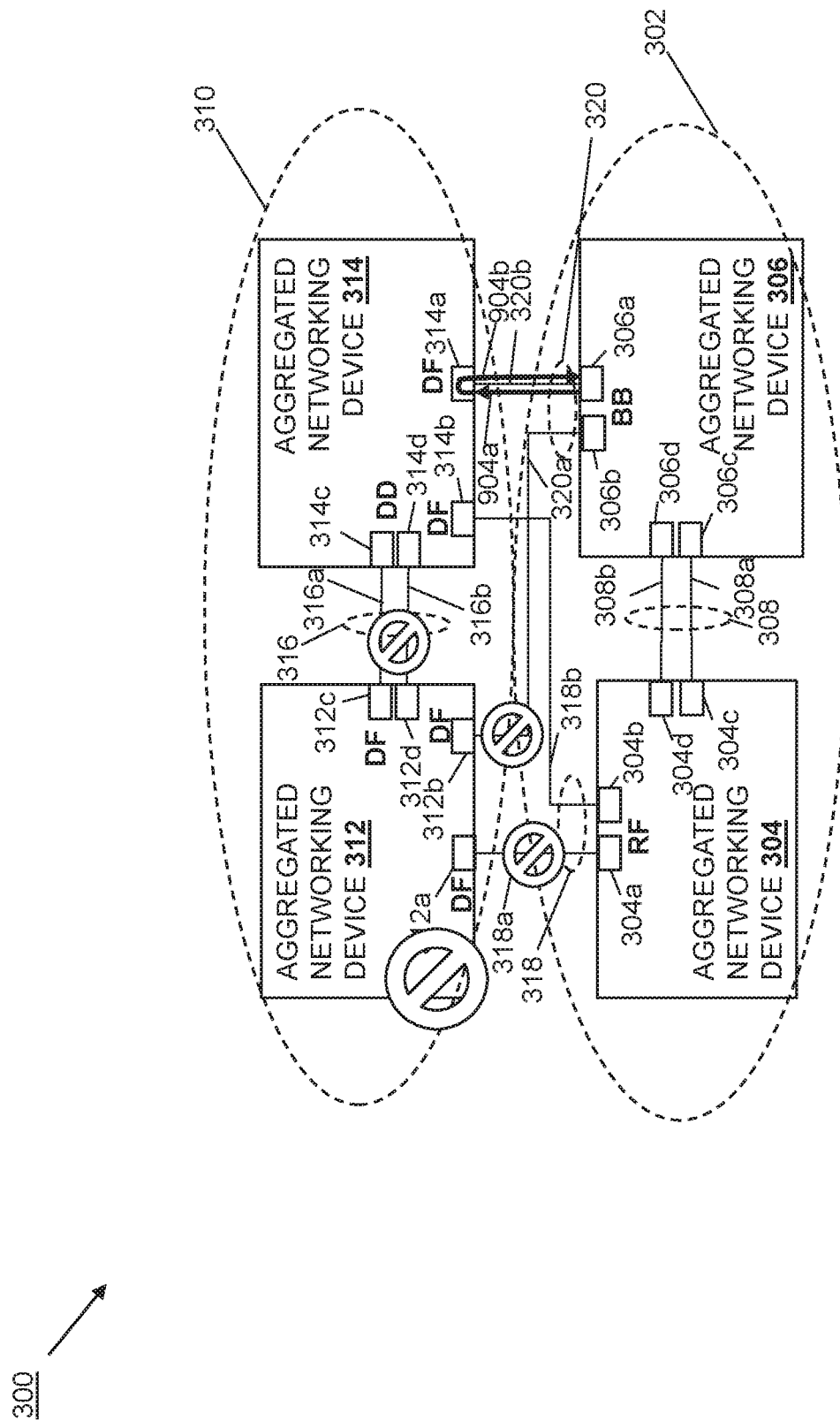

Referring to FIG. 9B, the aggregated networking device 306 may transmits a control message 904a (e.g., a proposal BPDU) to the aggregated networking device 314 via the link 320b, and the spanning tree protocol engine 406 in the aggregated networking device 314/400 may receive the control message 904a and determine whether the control message 904a includes the old root information by comparing the root information in the control message 904a to root information that was provided by the aggregated networking device 312 and stored in the spanning tree protocol database 410. If the root information provided in the control message 904a includes the root information that was provided by the aggregated networking device 312, then the aggregated networking device 314 may redirect the control message 904a as a redirected control message 904b back to the aggregated networking device 306 via the link 320b. Upon receiving its own control message, the aggregated networking device 306 may define the port 306a to be in a backup role and the blocking state ("BB").

Figure 9C:
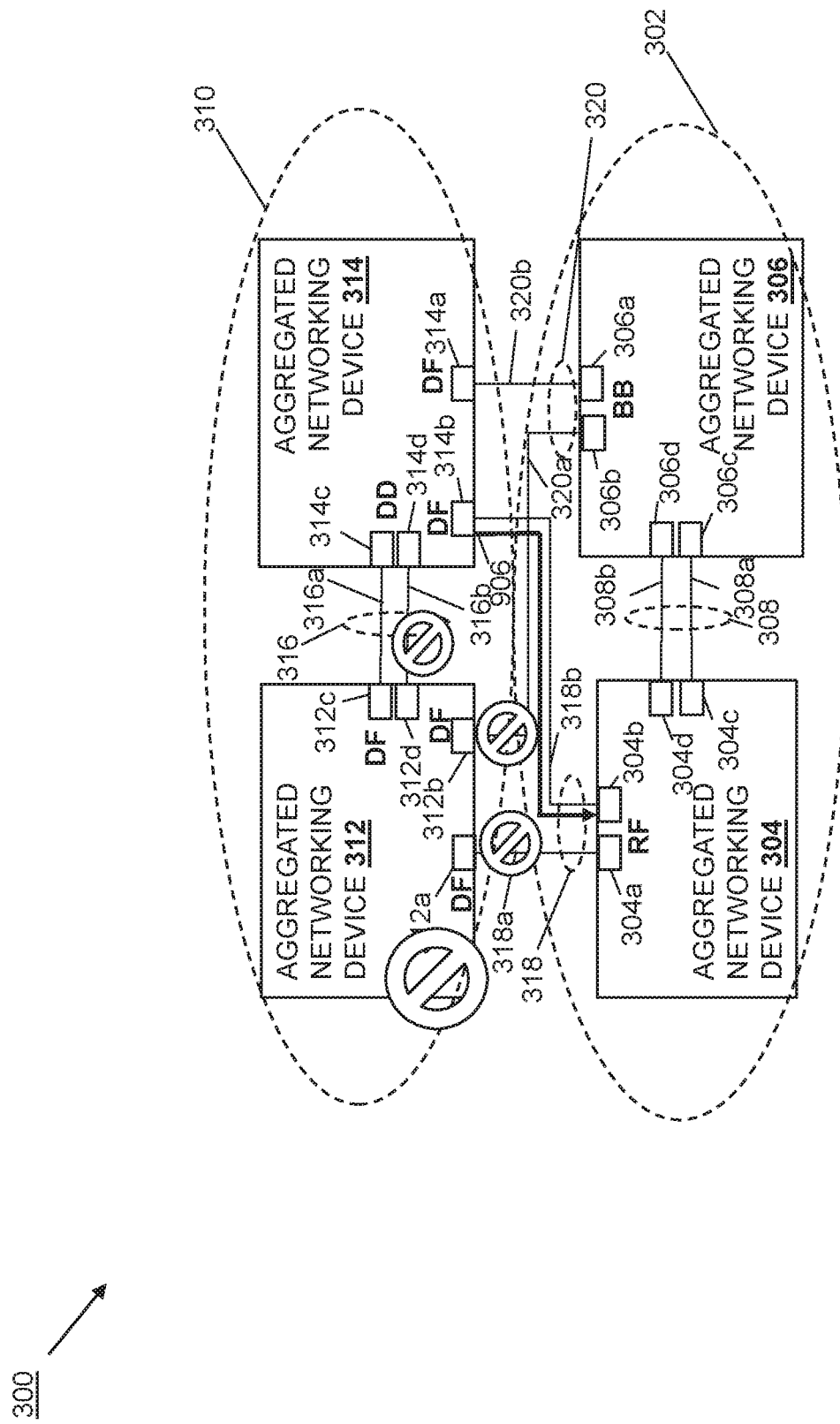

Referring to FIG. 9C, the aggregated networking device 314 may transmit a control message 906 on the active links (e.g., the link 918b), and the control message 906 may include the new root information that defines the aggregated networking device 314 as the root bridge and the link aggregation domain 310 as the designated bridge. As such, the aggregated networking device 304 may immediately accept the aggregated networking device identifier for the aggregated networking device 314 as the root bridge because the designated bridge identifier (e.g., the link aggregation domain identifier for the link aggregation domain 310) in the control message 906 is the same as the designated bridge identifier the aggregated networking device 304 received in the control message 602b at lock 502. In some embodiments, the aggregated networking device 304 may also share the new root information received in the control message 906 with the aggregated networking device 306.

Figure 9D:
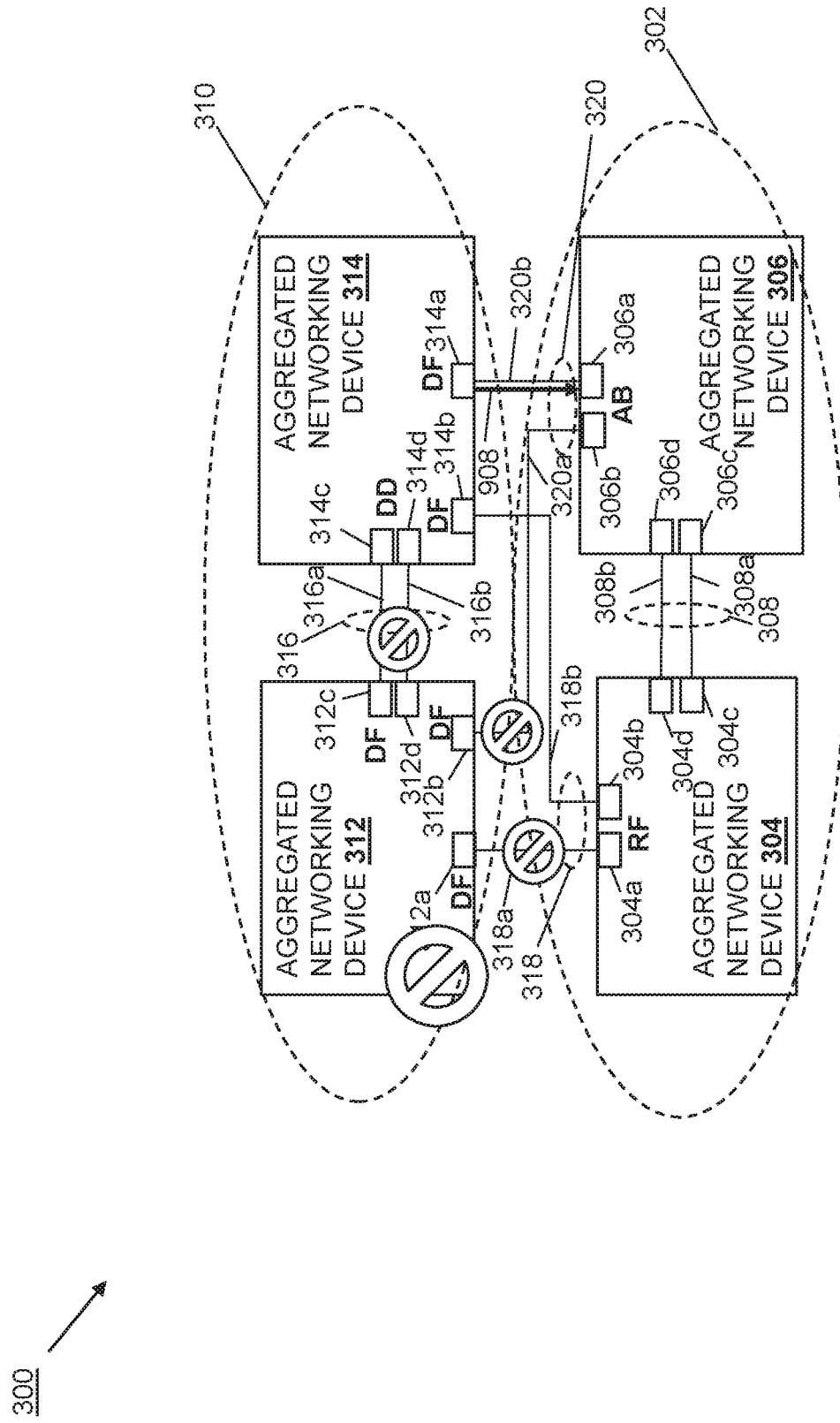

Referring to FIG. 9D, the aggregated networking device 314 may transmit a control message 908 on the alternate links (e.g., the link 920b), and the control message 908 may include the new root information that defines the aggregated networking device 314 as the root bridge and the link aggregation domain 310 as the designated bridge. As such, the aggregated networking device 304 may accept the new root information as it matches the root information at the port 304b that is a root port. As a result, the spanning tree protocol engine 406 of the aggregated networking device 306 may define the port 306a to be in the alternate role and blocking state.

Figure 10A:
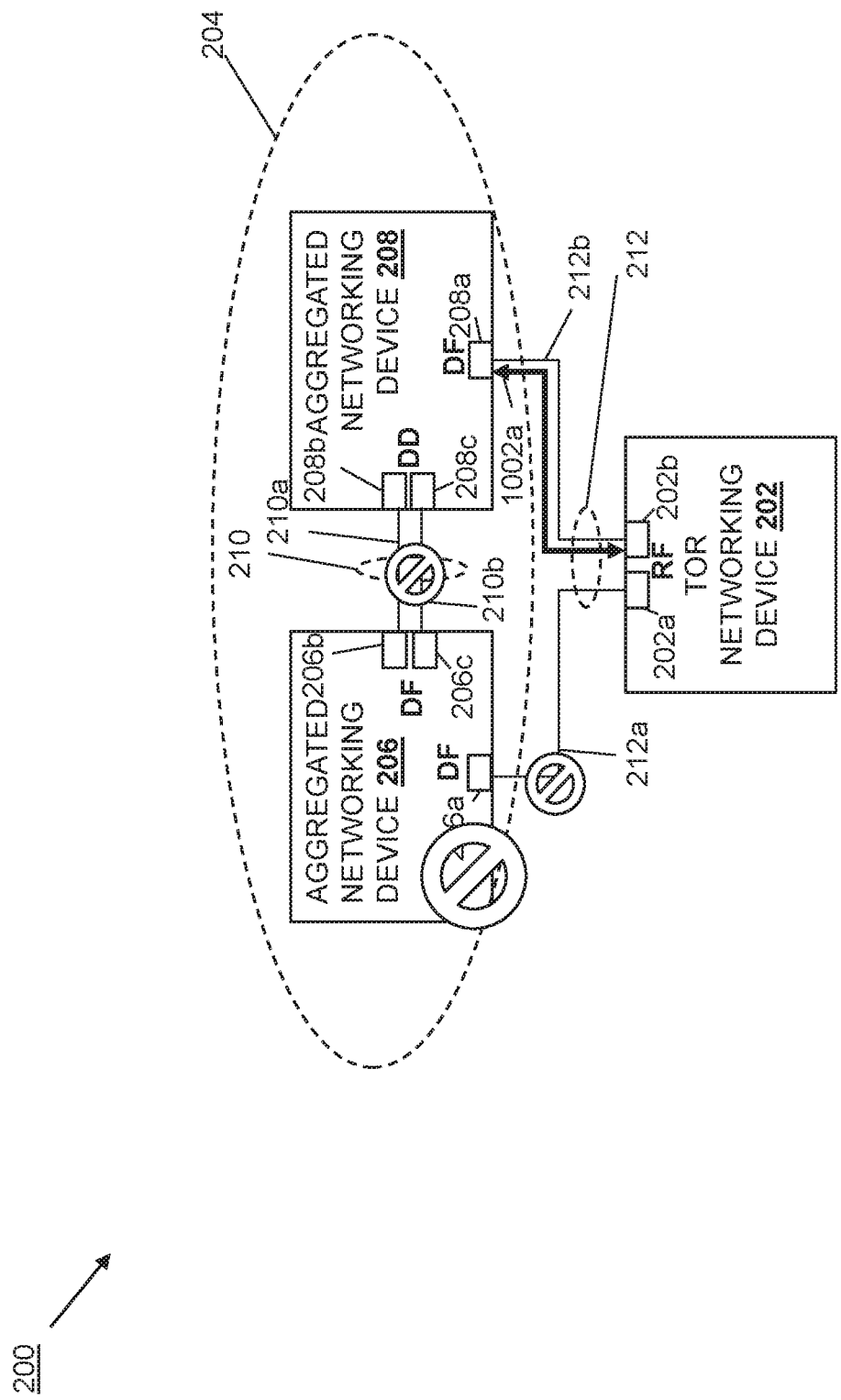
FIG. 10A is a schematic view illustrating an embodiment of the spanning tree enabled link aggregation system of FIG. 2 during the method of FIG. 5.
Figure 10B:
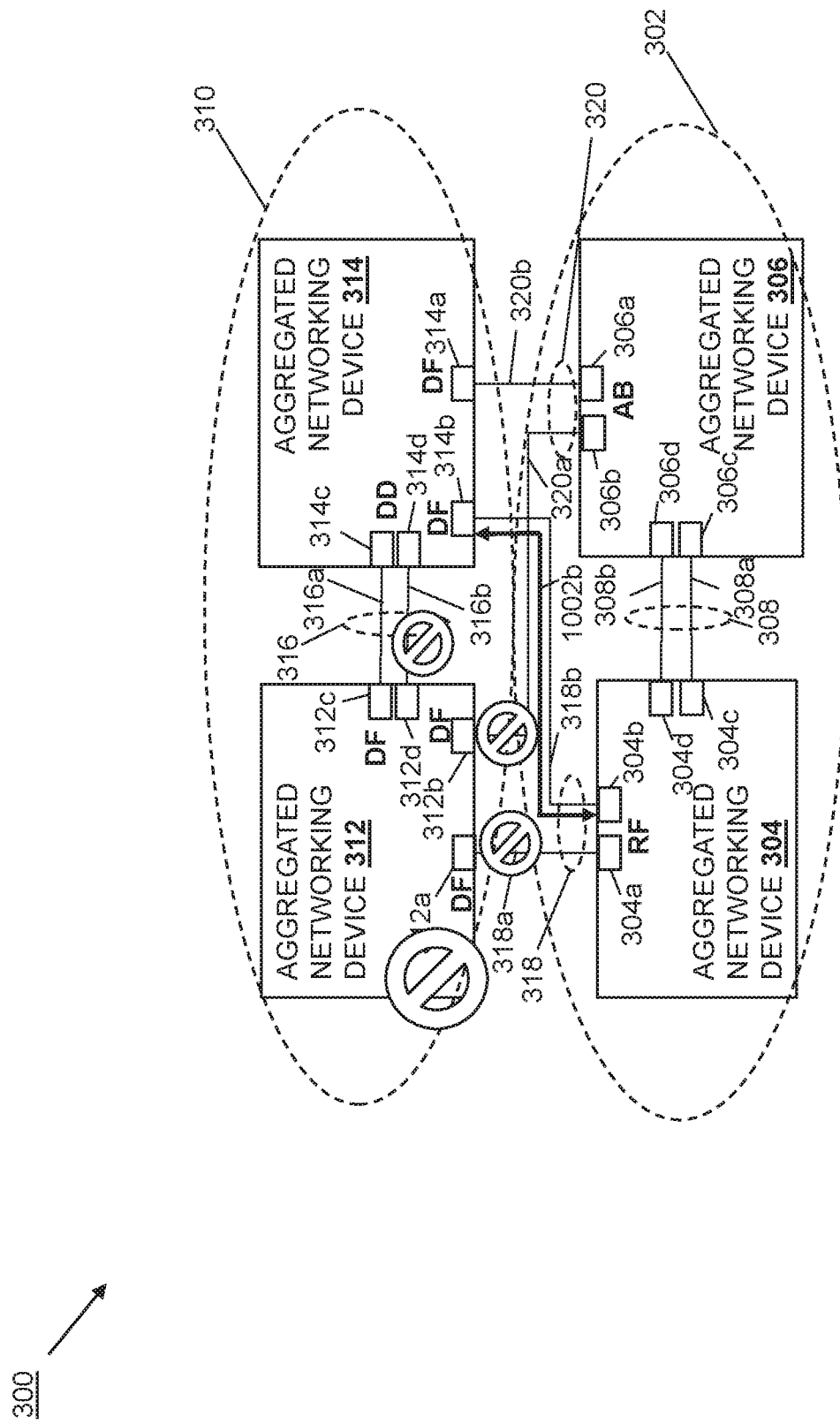
FIG. 10B is a schematic view illustrating an embodiment of the spanning tree enabled link aggregation system of FIG. 3 during the method of FIG. 5.

The method 500 then proceeds to block 510 where traffic is transmitted via the LAG, In an embodiment, at block 510 and with reference to the spanning tree enabled link aggregation system 200 of FIG. 2 and FIG. 10A, the aggregated networking device 208 and the TOR networking device 202 may transmit network traffic 1002a via link 212b. In an embodiment, at block 510 and with reference to the spanning tree enabled link aggregation system 300 of FIG. 3 and FIG. 10B, the aggregated networking device 314 and the aggregated networking device 304 may transmit network traffic 1002b via link 318b, with network traffic blocked on the link 320b as the port 306a is defined as an alternate blocking port.

Thus, systems and methods have been described that provide for recovery operations in spanning tree enabled link aggregation systems when an aggregated networking device becomes unavailable. When an aggregated networking device included in a link aggregation domain is designated as a root link aggregation primary node, that aggregated networking device defines the link aggregation domain as a designated bridge when transmitting control messages. As such, when that aggregated networking device fails, another aggregated networking device becomes a new root link aggregation primary node and may provide control messages that define the link aggregation domain as the designated bridge. If there are alternate links coupled to the new root link aggregation primary node, the control messages may be first sent on those alternate links and then sent on active links. The new root link aggregation primary node may also redirect control messages received over alternate links that include old root information from the old root link aggregation primary node. The redirection of control messages and transmission of new root information on the alternate links first prevents that alternate link from moving from a blocking state to a forwarding state. As such, one of skill in the art in possession of the present disclosure will recognize how the teachings provided herein will minimize traffic loss during root convergence when the root link aggregation primary node becomes unavailable and has to become reestablished on the link aggregation secondary node.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spanning tree enabled link aggregation system, comprising:
a plurality of aggregated networking devices that are included in a first link aggregation domain, that are aggregated according to an aggregation protocol, and that include:
a first aggregated networking device that includes a first Link Aggregation Group (LAG) port and a first inter-chassis link (ICL) port, wherein the first aggregated networking device is designated as a root link aggregation primary node by a spanning tree protocol engine running on the first aggregated networking device, and wherein the designation as the root link aggregation primary node designates the first aggregated networking device as a root bridge according to a Spanning Tree Protocol (STP) and as a link aggregation primary node in the first link aggregation domain according to the aggregation protocol; and
a second aggregated networking device that includes a second LAG port and a second ICL port that is coupled to the first ICL port via a first ICL, wherein the second aggregated networking device is designated as a link aggregation secondary node in the first link aggregation domain according to the aggregation protocol by a spanning tree protocol engine running on the second aggregated networking device; and
a networking device that includes:
a first networking device port that is coupled to the first LAG port via a first LAG link that is included in a first LAG, and a second networking device port that is coupled to the second LAG port via a second LAG link that is included in the first LAG,
wherein the spanning tree protocol engine included on the first aggregated networking device is configured to:
provide, to the networking device via the first LAG link, a first control message that defines:
the first aggregated networking device as the root bridge according to the STP; and
the first link aggregation domain as a designated bridge according to the STP, and
wherein the spanning tree protocol engine included on the second aggregated networking device is configured to:
detect that the first aggregated networking device is no longer available and, in response, designate the second aggregated networking device as the root link aggregation primary node;
provide, to the networking device via the second LAG link, a second control message that defines:
the second aggregated networking device as the root bridge according to the STP; and
the first link aggregation domain as the designated bridge according to the STP; and
transmit, in response to the networking device accepting the second aggregated networking device as the root bridge based on the first link aggregation domain being defined as the designated bridge in both the first control message and the second control message, network traffic between the networking device and the second aggregated networking device.

2. The system of claim 1, wherein the networking device includes a third networking device port that is coupled to a third LAG port on the first aggregated networking device via a third LAG link that is included in a second LAG and that is designated as an alternate link, and a fourth networking device port that is coupled to a fourth LAG port on the second aggregated networking device via a fourth LAG link that is included in the second LAG and that is designated as an alternate link, and wherein the spanning tree protocol engine included on the second aggregated networking device is configured to:
provide the second control message to the networking device via the fourth LAG link before providing the second control message on the second LAG link; and
redirect a third control message sent from the networking device on the fourth LAG link back to the networking device via the fourth LAG link.

3. The system of claim 2, wherein the networking device includes:
a third aggregated networking device that includes the third LAG port and a third ICL port; and
a fourth aggregated networking device that includes the fourth LAG port and a fourth ICL port that is coupled to the third ICL port via a second ICL, wherein the third aggregated networking device and the fourth aggregated networking device are included in a second link aggregation domain.

4. The system of claim 2, wherein the third control message includes information from the first control message that defines the first aggregated networking device as the root bridge, and wherein the redirecting the third control message sent from the networking device on the fourth LAG link back to the networking device via the fourth LAG link is performed in response to the spanning tree protocol engine included on the second aggregated networking device detecting that the third control message defines the root bridge as the first aggregated networking device.

5. The system of claim 2, wherein the spanning tree protocol engine included on the second aggregated networking device is configured to:
discontinue redirection of control messages received from the networking device via the fourth LAG link at the fourth LAG port subsequent to sending the second control message.

6. The system of claim 5, wherein the spanning tree protocol engine included on the second aggregated networking device is configured to:
provide, to the networking device via the fourth LAG link, a fourth control message that defines the second aggregated networking device as the root bridge, and that defines the first link aggregation domain as the designated bridge.

7. The system of claim 6, wherein the networking device is configured to:

receive the fourth control message via the fourth LAG link and, in response, redefine the fourth networking device port as an alternate port prior to the transmitting of the network traffic.

8. The system of claim 1, wherein the defining the first link aggregation domain as the designated bridge includes providing a link aggregation domain identifier in the first control message.

9. An Information Handling System (IHS), comprising:
a communication system that includes:
at least one inter-chassis link (ICL) port that is configured to couple to a first ICL that is coupled to a first aggregated networking device to form a first link aggregation domain according to an aggregation protocol; and
a first port that is configured to couple to a first Link Aggregation Group (LAG) link that is included in a first LAG and that is coupled to a networking device;
a processing system that is coupled to the communication system; and
a memory system that is coupled to the processing system and that includes instructions that, when executed by the processing system, cause the processing system to provide a spanning tree protocol engine that is configured to:
detect that the first aggregated networking device that is designated as a root link aggregation primary node is no longer available and, in response, designate the communication system as the root link aggregation primary node, wherein the designation as the root link aggregation primary node designates the communication system as a root bridge according to a Spanning Tree Protocol (STP) and as a link aggregation primary node in the first link aggregation domain according to the aggregation protocol;
provide, to the networking device via the first LAG link, a first control message that defines:
the communication system as a root bridge according to the STP: and
the first link aggregation domain as a designated bridge according to the STP; and
transmit, in response to the networking device accepting the communication system as the root bridge based on the first link aggregation domain being defined as the designated bridge in both the first control message and a second control message that was transmitted to the networking device by the first aggregated networking device prior to the first aggregated networking device becoming unavailable and via a second LAG link included in the first LAG, network traffic between the networking device and the communication system.

10. The IHS of claim 9, wherein the communication system includes a second port that is configured to couple with a third LAG link that is included in a second LAG and that is designated as an alternate link, and wherein the spanning tree protocol engine is configured to:
provide the first control message to the networking device via the third LAG link before the providing the first control message on the first LAG link; and
redirect a third control message sent from the networking device on the third LAG link back to the networking device via the third LAG link.

11. The IHS of claim 10, wherein the networking device includes:

a third aggregated networking device that is coupled to the third LAG link and that is coupled to a second ICL; and
a fourth aggregated networking device that is coupled to the second ICL, wherein the third aggregated networking device and the fourth aggregated networking device are included in a second link aggregation domain.

12. The IHS of claim 10, wherein the third control message includes information from the second control message that defines the first aggregated networking device as the root bridge, and wherein the redirecting the third control message sent from the networking device on the third LAG link back to the networking device via the third LAG link is performed in response to the spanning tree protocol engine detecting that the third control message defines the root bridge as the first aggregated networking device.

13. The IHS of claim 10, wherein the spanning tree protocol engine is configured to:
discontinue redirection of control messages received from the networking device via the third LAG link subsequent to sending the first control message on the first LAG link.

14. The IHS of claim 13, wherein the spanning tree protocol engine is configured to:
provide, to the networking device via the third LAG link, a fourth control message that defines the communication system as the root bridge, and that defines the first link aggregation domain as the designated bridge, wherein the third control message causes the networking device to redefine a port that is included in the networking device and that is coupled to the third LAG link as an alternate port prior to the transmitting of the network traffic.

15. A method of recovery in a spanning tree enabled link aggregation system, comprising:
detecting, by a second aggregated networking device that is coupled via a first inter-chassis link (ICL) to a first aggregated networking device and that is included with the first aggregated networking device in a first link aggregation domain according to an aggregation protocol, that the first aggregated networking device that is designated as a root link aggregation primary node is no longer available and, in response, designating the second aggregated networking device as the root link aggregation primary node, wherein the designation as the root link aggregation primary node designates the second aggregated networking device as a root bridge according to a Spanning Tree Protocol (STP) and as a link aggregation primary node in the first link aggregation domain according to the aggregation protocol;
providing, by the second aggregated networking device to a networking device via a first Link Aggregation Group (LAG) link that is included in a first LAG, a first control message that defines:
the second aggregated networking device as a root bridge according to the STP: and
the first link aggregation domain as a designated bridge according to the STP; and
transmitting, by the second aggregated networking device and in response to the networking device accepting the second aggregated networking device as the root bridge based on the first link aggregation domain being defined as the designated bridge in both the first control message and a second control message that was transmitted to the networking device by the first aggregated networking device prior to the first aggregated networking device becoming unavailable and via a second LAG link included in the first LAG, network traffic between the networking device and the second aggregated networking device.

16. The method of claim 15, further comprising:
providing, by the second aggregated networking device that is coupled with a third LAG link that is included in a second LAG and that is designated as an alternate link, the first control message to the networking device via the third LAG link before providing the first control message on the first LAG link; and
redirecting, by the second aggregated networking device, a third control message sent from the networking device on the third LAG link back to the networking device via the third LAG link.

17. The method of claim 16, wherein the networking device includes:
a third aggregated networking device that is coupled to the third LAG link and that is coupled to a second ICL; and
a fourth aggregated networking device that is coupled to the second ICL, wherein the third aggregated networking device and the fourth aggregated networking device are included in a second link aggregation domain.

18. The method of claim 16, wherein the third control message includes information from the second control message that defines the first aggregated networking device as the root bridge, and wherein the redirecting the third control message sent from the networking device on the third LAG link back to the networking device via the third LAG link is performed in response to the second aggregated networking device the detecting that the third control message defines the root bridge as the first aggregated networking device.

19. The method of claim 16, further comprising:
discontinuing, by the second aggregated networking device, redirection of control messages received from the networking device via the third LAG link subsequent to sending the first control message on the first LAG link.

20. The method of claim 19: further comprising:
providing, by the second aggregated networking device to the networking device via the third LAG link, a fourth control message that defines the second aggregated networking device as the root bridge, and that defines the first link aggregation domain as the designated bridge, wherein the third control message causes the networking device to redefine a port coupled to the third LAG link as an alternate port prior to the transmitting of the network traffic.

* * * * *